(12) United States Patent
Lei et al.

(10) Patent No.: US 8,924,452 B2
(45) Date of Patent: Dec. 30, 2014

(54) FIXED-COEFFICIENT VARIABLE PRIME LENGTH RECURSIVE DISCRETE FOURIER TRANSFORM SYSTEM

(75) Inventors: Sheau-Fang Lei, Tainan (TW); Shin-Chi Lai, Kaohsiung (TW); Chuan-An Chang, New Taipei (TW)

(73) Assignee: National Cheng Kung University, Tainan City (TW)

( * ) Notice: Subject to any disclaimer, the term of this patent is extended or adjusted under 35 U.S.C. 154(b) by 245 days.

(21) Appl. No.: 13/557,451

(22) Filed: Jul. 25, 2012

(65) Prior Publication Data
US 2013/0173680 A1    Jul. 4, 2013

(30) Foreign Application Priority Data

Jan. 2, 2012    (TW) .............................. 101100101 A

(51) Int. Cl.
*G06F 15/00*    (2006.01)
(52) U.S. Cl.
USPC ......................................................... 708/405
(58) Field of Classification Search
CPC ... G06F 17/141; G06F 17/142; G06F 17/143; G06G 7/1921; G01R 23/00
USPC ......................................................... 708/405
See application file for complete search history.

(56) References Cited

U.S. PATENT DOCUMENTS

| | | | | |
|---|---|---|---|---|
| 3,344,349 A | * | 9/1967 | Schroeder | 324/76.21 |
| 4,010,360 A | * | 3/1977 | Alsup et al. | 708/405 |
| 4,152,772 A | * | 5/1979 | Speiser et al. | 708/402 |

\* cited by examiner

*Primary Examiner* — Tan V. Mai
(74) *Attorney, Agent, or Firm* — Bacon & Thomas, PLLC

(57) ABSTRACT

A fixed-coefficient variable prime length recursive discrete Fourier transform system includes a pre-processing device, a real-part computation device, an imaginary-part computation device and a post-processing device. The pre-processing device receives N digital input signals and performs order permutation operation to generate first and second temporal signals, wherein N is a prime number. The real-part computation device receives the real part of the first and second temporal signals and performs discrete cosine/sine transform to generate third and fourth temporal signals. The imaginary-part computation device receives the imaginary part of the first and second temporal signals and performs discrete cosine/sine transform to generate fifth and sixth temporal signals. The post-processing device receives the third, fourth, fifth and sixth temporal signals to perform order permutation and addition operations for generating N digital output signals, wherein the N digital output signals are the discrete Fourier transform of the N digital signals.

10 Claims, 19 Drawing Sheets

US 8,924,452 B2

FIXED-COEFFICIENT VARIABLE PRIME LENGTH RECURSIVE DISCRETE FOURIER TRANSFORM SYSTEM

CROSS REFERENCE TO RELATED APPLICATION

This application claims the benefits of the Taiwan Patent Application Serial Number 101100101, filed on Jan. 2, 2012, the subject matter of which is incorporated herein by reference.

BACKGROUND OF THE INVENTION

1. Field of the Invention

The present invention relates to the technical field of digital signal processing and, more particularly, to a fixed-coefficient variable prime length recursive discrete Fourier transform system.

2. Description of Related Art

With the rapid development of digital signal processing technique, users can conveniently obtain messages and enjoy various multimedia information in daily life, in which Discrete Fourier Transform (DFT) has been widely applied in various audio codec standards.

The hardware architecture of DFT can be divided into parallel architecture and recursive architecture. In comparison with the parallel architecture, the recursive architecture has drawbacks in having high computation cycle, lowering the precision degree due to increase of frame size, and negatively influencing the chip area due to coefficient-generated ROM. Therefore, there are several Recursive DFT (RDFT) methods proposed to reduce the computation cycle, complexity, and amount of coefficient required.

A method of computing DFT is proposed by taking a recursive architecture as its kernel (See Goertzel "An algorithm for the evaluation of finite trigonometric series", American mathematical monthly, pp. 34-35, 1958). Further, a hardware architecture is also proposed, which requires N2 cycles to compute N points of DFT, while the overall hardware requires six adders and six multipliers (See Curtis & Wickenden "Hardware-based Fourier transforms: algorithms and architectures", Radar and Signal Processing, IEE Proceedings F, vol. 130, pp. 423-432, 1983)

In Yang & Chen "Recursive discrete Fourier transform with unified IIR filter structures", Elsevier Science B. V. Signal Process, vol. 82, pp. 31-41, 2002, a hardware architecture is also proposed that requires N2 cycles to compute N points of DFT, and the overall hardware requires twelve adders and six multipliers. Moreover, in Lai, Chang, Lin, & Luo "Low Computational Complexity, Low Power, and Low Area. Design for the Implementation of Recursive DFT and IDFT Algorithms" Circuits and Systems II: Express Briefs, IEEE Transactions on, vol. 56, pp. 921-925, 2009, the proposed hardware architecture requires 12 adders and two multipliers.

Even though the RDFT has been developed for several years, there is still a need to have an RDFT system capable of reducing the computation complexity, lowering the hardware cost, and increasing the data computation efficiency.

SUMMARY OF THE INVENTION

The object of the present invention is to provide a fixed-coefficient variable prime length recursive discrete Fourier transform system, which has a low computation complexity, uses a small amount of multiplication coefficients, and provides a high-efficient data computation.

To achieve the object, there is provided a fixed-coefficient variable prime length recursive discrete Fourier transform system, which includes: a pre-processing device for receiving N input digital signals and performing an order permutation operation to the N input digital signals, so as to generate a first temporal signal and a second temporal signal, where N is a prime number; a real-part computation device connected to the pre-processing device for receiving real part of the first temporal signal and real part of the second temporal signal and performing a recursive discrete cosine/sine operation, so as to generate a third temporal signal and a fourth temporal signal; an imaginary-part computation device connected to the pre-processing device for receiving imaginary part of the first temporal signal and imaginary part of the second temporal signal and performing a recursive discrete cosine/sine operation, so as to generate a fifth temporal signal and a sixth temporal signal; and a post-processing device connected to the real-part computation device and the imaginary-part computation device for receiving the third temporal signal, the fourth temporal signal, the fifth temporal signal and the sixth temporal signal, and performing an order permutation operation and addition operation, so as to generate N output signals, wherein the N output signals are discrete Fourier transform of the N input digital signals.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
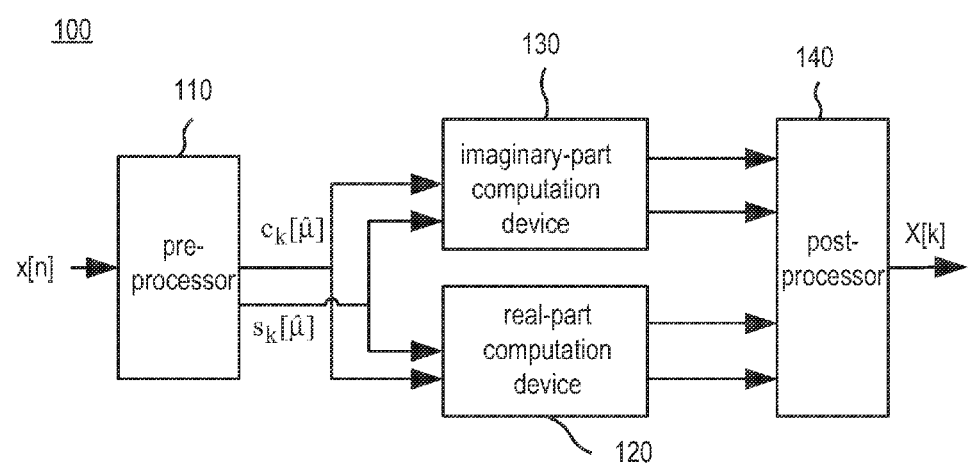
FIG. 1 shows a fixed-coefficient variable prune length recursive discrete Fourier transform system in accordance with a preferred embodiment of the present invention.

With reference to FIG. 1, there is shown a fixed-coefficient variable prime length recursive discrete Fourier transform system 100 in accordance with a preferred embodiment of the present invention, which includes: pre-processor 110, a real-part computation device 120, an imaginary-part computation device 130 and a post-processor 140.

The pre-processor device 110 receives N input digital signals (x[n]) and performs an order permutation operation on the N input digital signals, so as to generate a first temporary signal ($c_k[\hat{\mu}]$) and a second temporal signal ($s_k[\hat{\mu}]$), where N is a prime number.

The real-part computation device 120 is connected to the pre-processor 110 for receiving the real part of the first temporal signal ($c_k[\hat{\mu}]$) and the real part of the second temporary signal ($s_k[\hat{\mu}]$) so as to execute a recursive discrete cosine/sine operation, thereby generating a third temporary signal and a fourth temporary signal.

The imaginary-part computation device 130 is connected to the pre-processor 110 for receiving the imaginary part of the first temporal signal ($c_k[\hat{\mu}]$) and the imaginary part of the second temporary signal ($s_k[\hat{\mu}]$), so as to execute a recursive discrete cosine/sine operation, thereby generating a fifth temporary signal and a sixth temporary signal.

The post-processor 140 is connected to the real-part computation device 120 and the imaginary-part computation device 130 for receiving the third temporary signal, the fourth temporary signal, the fifth temporary signal and the sixth temporary signal, so as to perform an order permutation and adding operation on the third temporary signal, the fourth temporary signal, the fifth temporary signal and the sixth temporary signal, thereby generating N output signals (X[k]), wherein the N output signals (X[k]) are discrete Fourier transform of the N input digital signals x[n].

The N output signals (X[k]) can be expressed, by splitting into sine and cosine forms, as follows:

$$X[k] = \sum_{n=0}^{N-1} x[n] \cdot W_N^{nk}, k = 0, 1, \ldots N-1 = \sum_{n=0}^{N-1} x[n] \cdot \cos\left(\frac{2nk\pi}{N}\right) - j\sum_{n=0}^{N-1} x[n] \cdot \sin\left(\frac{2nk\pi}{N}\right). \quad (1)$$

When k=0, it can observe, from equation (1), the real-part and imaginary-part coefficients cos(2nkπ/N) and sin(2nkπ/N) are 1 and 0, respectively, while X[0] can be expressed as:

$$X[0] = \sum_{n=0}^{N-1} x[n], \text{ and} \quad (2)$$

$$X[k] = \sum_{n=0}^{N-1} x[n] \cdot \cos\left(\frac{2nk\pi}{N}\right) - j\sum_{n=0}^{N-1} x[n] \cdot \sin\left(\frac{2nk\pi}{N}\right), \quad (3)$$

$$k = 1, 2, \ldots N-1.$$

From equation (2), it is known that X[0] is the summation of the original input signals, which can be implemented by a simple accumulator independently.

Applying change of variable to equation (3) to substitute k with N−k for performing a reverse order permutation operation, we have:

$$X[N-k] = \quad (4a)$$

$$\sum_{n=0}^{N-1} x[n] \cdot \cos\left(\frac{2n(N-k)\pi}{N}\right) - j\sum_{n=0}^{N-1} x[n] \cdot \sin\left(\frac{2n(N-k)\pi}{N}\right),$$

$$k = 1, 2, \ldots N-1.$$

By applying addition formula of trigonometric function into $$\cos\left(\frac{2n(N-k)\pi}{N}\right) \text{ and } \sin\left(\frac{2n(N-k)\pi}{N}\right)$$

of equation (4a), we have:

$$\cos\left(\frac{2n(N-k)\pi}{N}\right) = \cos\left(\frac{2nN\pi}{N}\right)\cos\left(\frac{2nk\pi}{N}\right) + \quad (4b)$$
$$\sin\left(\frac{2nN\pi}{N}\right)\sin\left(\frac{2nk\pi}{N}\right)$$
$$= \cos\left(\frac{2nk\pi}{N}\right),$$

$$\sin\left(\frac{2n(N-k)\pi}{N}\right) = \sin\left(\frac{2nN\pi}{N}\right)\cos\left(\frac{2nk\pi}{N}\right) - \quad (4c)$$
$$\cos\left(\frac{2nN\pi}{N}\right)\sin\left(\frac{2nk\pi}{N}\right)$$
$$= -\sin\left(\frac{2nk\pi}{N}\right),$$

Applying equations (4b) and (4c) to equation (4a), we have:

$$X[N-k] = \sum_{n=0}^{N-1} x[n] \cdot \cos\left(\frac{2nk\pi}{N}\right) + j\sum_{n=0}^{N-1} x[n] \cdot \sin\left(\frac{2nk\pi}{N}\right), \quad (5)$$

$$k = 1, 2, \ldots N-1.$$

Because the present invention explores on prime number point N and k=0 has been computed independently in equation (2), it can be seen, from observing equations (3) and (5), that X(k) and X(N−k) only have difference in positive/negative sign for the imaginary parts. Therefore, it is applicable to compute two points for one time; i.e., among the k=1~N−1 points, only half of points $$k = 1 \sim \frac{(N-1)}{2}$$

are required for computation to obtain $$k = \frac{(N+1)}{2} \sim N-1$$

DFT result.

When n=0, the x[0] in equation (3) can be moved out of the recursive kernel for addition, and thus equation (3) can be expressed as:

$$X[k] = x[0] + \sum_{n=1}^{N-1} x[n] \cdot \cos\left(\frac{2nk\pi}{N}\right) - j\sum_{n=1}^{N-1} x[n] \cdot \sin\left(\frac{2nk\pi}{N}\right) \quad (6)$$

$$= x[0] + \sum_{n=0}^{(N-1)-1} x[n+1] \cdot \cos\left(\frac{2(n+1)k\pi}{N}\right) -$$

$$j\sum_{n=0}^{(N-1)-1} x[n+1] \cdot \sin\left(\frac{2(n+1)k\pi}{N}\right)$$

$$= x[0] + \sum_{n=0}^{\frac{(N-1)}{2}-1} x[n+1] \cdot \cos\left(\frac{2(n+1)k\pi}{N}\right) +$$

$$\sum_{n=(N-1)/2}^{(N-1)-1} x[n+1] \cdot \cos\left(\frac{2(n+1)k\pi}{N}\right) -$$

$$j\left[\sum_{n=0}^{\frac{(N-1)}{2}-1} x[n+1] \cdot \sin\left(\frac{2(n+1)k\pi}{N}\right) +\right.$$

$$\left.\sum_{n=(N-1)/2}^{(N-1)-1} x[n+1] \cdot \sin\left(\frac{2(n+1)k\pi}{N}\right)\right],$$

$$k = 1, 2, \ldots \frac{N-1}{2}.$$

In equation (6), the recursively accumulated part for the real part and the imaginary part is split into a front segment $$n = 0 \sim \frac{(N-1)}{2} - 1$$

and a rear segment $$n = \frac{(N-1)}{2} \sim (N-1) - 1$$

for computation. Then, change of variable is used to substitute n with (N−1)−1−n for performing a reverse order permutation operation, we have:

$$X[k] = x[0] + \sum_{n=0}^{R-1} x[n+1] \cdot \cos\left(\frac{2(n+1)k\pi}{N}\right) + \quad (7a)$$

$$\sum_{n=0}^{R-1} x[N-1-n] \cdot \cos\left(\frac{2(N-1-n)k\pi}{N}\right) -$$

-continued $$j\left[\sum_{n=0}^{R-1} x[n+1] \cdot \sin\left(\frac{2(n+1)k\pi}{N}\right) +\right.$$

$$\left.\sum_{n=0}^{R-1} x[N-1-n] \cdot \sin\left(\frac{2(N-1-n)k\pi}{N}\right)\right],$$

where $R = \frac{(N-1)}{2}$.

By applying the addition formula of trigonometric function to $$\cos\left(\frac{2(N-1-n)k\pi}{N}\right) \text{ and } \sin\left(\frac{2(N-1-n)k\pi}{N}\right)$$

of equation (9a), we have:

$$\cos\left(\frac{2(N-1-n)k\pi}{N}\right) = \cos\left(\frac{2Nk\pi}{N}\right)\cos\left(\frac{2(n+1)k\pi}{N}\right) + \quad (7b)$$

$$\sin\left(\frac{2Nk\pi}{N}\right)\sin\left(\frac{2(n+1)k\pi}{N}\right)$$

$$= \cos\left(\frac{2(n+1)k\pi}{N}\right).$$

$$\sin\left(\frac{2(N-1-n)k\pi}{N}\right) = \sin\left(\frac{2Nk\pi}{N}\right)\cos\left(\frac{2(n+1)k\pi}{N}\right) - \quad (7c)$$

$$\cos\left(\frac{2Nk\pi}{N}\right)\sin\left(\frac{2(n+1)k\pi}{N}\right) - -$$

$$\sin\left(\frac{2(n+1)k\pi}{N}\right).$$

Applying equations (7b) and (7c) back to equation (7a), it can be seen that the recursions of the front and rear segments for the real part and the imaginary part have the same $$\cos\left(\frac{2(n+1)k\pi}{N}\right) \text{ and } \sin\left(\frac{2(n+1)k\pi}{N}\right).$$

Therefore, by taking out the common factor and multiplying new input signal, equation (7a) can be rewritten as:

$$X[k] = x[0] + \sum_{n=0}^{R-1} (x[n+1] + x[N-1-n]) \cdot \cos\left(\frac{2(n+1)k\pi}{N}\right) - \quad (8a)$$

$$j\sum_{n=0}^{R-1} (x[n+1] - x[N-1-n]) \cdot \sin\left(\frac{2(n+1)k\pi}{N}\right) =$$

$$x[0] + \sum_{n=0}^{R-1} c[n] \cdot C_N^{(n+1)k} - j\sum_{n=0}^{R-1} s[n] \cdot S_N^{(n+1)k},$$

$$k = 1, 2, \ldots \frac{N-1}{2}, n = 0, 1, \ldots \frac{N-1}{2} - 1,$$

wherein, $$c[n] = [n+1] + x[N-1-n], \quad (8b)$$

$$s[n] = [n+1] + x[N-1-n], \quad (8c)$$

where $$C_N^{(n+1)k} = \cos\left(\frac{2(n+1)k\pi}{N}\right), S_N^{(n+1)k} = \sin\left(\frac{2(n+1)k\pi}{N}\right).$$

With equation (8), X[k] is redefined as:

$$X[k]=X_{DCT}[k]-jX_{DST}[k], \quad (9)$$

wherein, $$X_{DCT}[k] = x[0] + \sum_{n=0}^{R-1} c[n] \cdot C_N^{(n+1)k}, \quad (10)$$

$$X_{DST}[k] = \sum_{n=0}^{R-1} s[n] \cdot S_N^{(n+1)k}. \quad (11)$$

From the result of equations (3, and (5), equation (9) determines to have:

$$X_{DCT}[k]=X_{DCT}[N-k], \quad (12)$$

$$X_{DST}[k]=-X_{DST}[N-k], \quad (13)$$

From the above derivation, it is known that, for the proposed RDFT kernel, the result of external number of points k in equations (12) and (13) exhibits a symmetry, and thus the number of computation is reduced to (N−1)/2 from the original N−1. From equations (10) and (11), it is known that, in each computation for k, the internal recursive number also is reduce to (N−1)/2 from the original N−1. As a result, the prime length RDFT method of the present invention is able to have the shortest computation cycle (N−1)(N−1)/4 for computing N points.

Coefficients are important to the output precision of DFT result, particularly in the recursive architecture. Therefore, how to effectively provide coefficients to a computation circuit becomes an issue to be challenged. The prior methods to address this challenge include:

1. Coefficient data is inputted from outside, which requires more I/O pins to increase the number of bits for coefficient input. Such a method may result in excessive number of I/O pins and increased overall area.

2. ROM (Read Only Memory) is built in a chip and an LUT (look-up table) is used to obtain the coefficients from the ROM. The size of ROM is getting increased as the number of points is increased. Since the recursive architecture is advantageous in having a smaller size, the use of ROM is not satisfactory due to increase of size and power consumption.

3. Coefficients are self-generated from a circuit. The additional circuit further gives suitable initial values, so as to compute the required coefficients based on the initial values. Although there is no need to have ROM circuit, such a method still needs some computation cycles and additional hardware cost to achieve the circuit for generating coefficients.

4. By fixing the coefficients required for the computation of recursive architecture, trigonometric function is employed periodically to derive the fixed coefficients, which does not require additional circuit architecture to compute coefficients. In comparison with the architecture that does not fix the coefficients, such a method does not need to change the hardware architecture and there is no ROM required. However, a pre-processing is required to re-permute the input signals Based on the requirement of pursuing least computation cycle and saving ROM, the present invention makes use of fixed-coefficient algorithm to process internal coefficients of RDFT.

In trigonometric function, the characteristics of cosine and sine are as follows:

$$\cos\theta=\cos(2n\pi+\theta), \quad (14a)$$

$$\cos\theta=\cos(2\pi-\theta), \quad (14b)$$

$$\cos\theta=-\cos(\pi-\theta), \quad (14c)$$

$$\sin\theta=\sin(2n\pi+\theta), \quad (14d)$$

$$\sin\theta=-\sin(2\pi+\theta), \quad (14e)$$

$$\sin\theta=\sin(\pi-\theta). \quad (14f)$$

Figure 2:
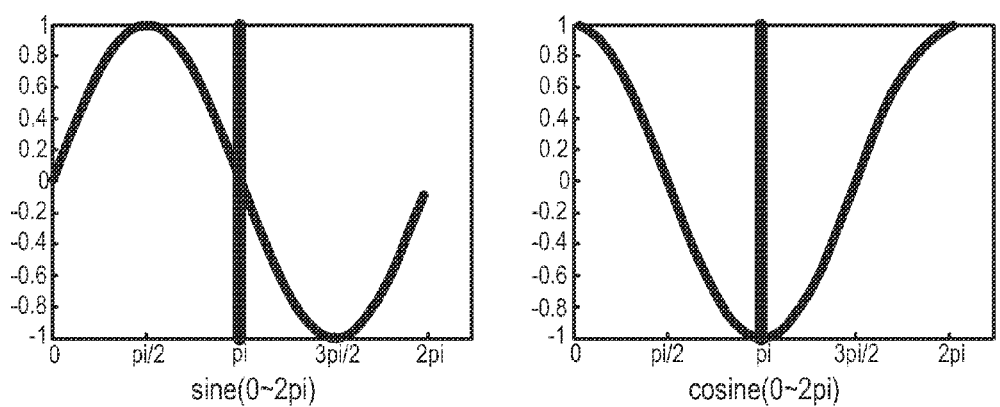
FIG. 2 is a schematic diagram illustrating the values of sine and cosine functions.
Figure 3:
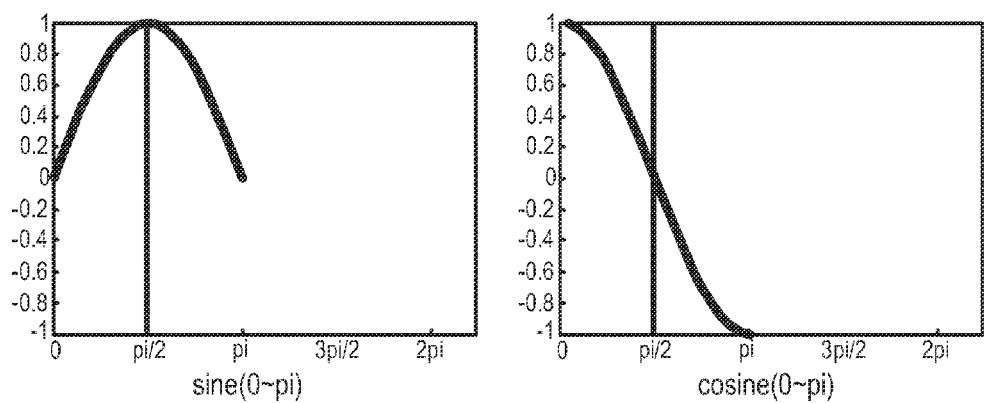
FIG. 3 is another schematic diagram illustrating the values of sine and cosine functions.

From equations (14a) and (14d), it is known that, as the function cycle is $2\pi$, any sine/cosine function with an angle larger than $2\pi$ can be expressed by an equivalent function with an angle within the degree of $2\pi$. From equations (14b) and (14e), it is known that any sine/cosine function with an angle of $2\pi\sim\pi$ can be expressed by an equivalent function with an angle of $0\sim\pi$. Because sine is an odd function, the value of sine function has to multiply with a negative sign when the angle is over $\pi$, as shown in FIG. 2. FIG. 2 is a schematic diagram illustrating the values of sine and cosine functions. Furthermore, From equations (14c) and (14f), it is known that any sine/cosine function with an angle of $\pi\sim\pi/2$ can be expressed by an equivalent function with an angle of $0\sim\pi/2$. Because cosine is an even function, the value of sine function has to multiply with a negative sign when the angle is over $\pi/2$, as shown in FIG. 3, FIG. 3 is another schematic diagram illustrating the values of sine and cosine functions.

Synthesizing the periodical characteristics of equations (14a) to (14f), the function value for any angle can be represented by an angle of $0\sim\pi/2$. Therefore, it is able to find a set of fixed coefficients in the angle of $0\sim\pi/2$.

Coefficients in DFT definition is referenced and re-expressed as $W_N^{2nk}$:

$$W_N^{nk} \Rightarrow W_N^{2nk} = \exp\left(\frac{2nk}{N}\pi\right), \quad (15)$$

$$k = 0, 1, \ldots N-1, n = 0, 1, \ldots N-1.$$

In equation (15), the index value n and number of points k are continuously increased in the recursive process of RDFT computation, is resulting in that coefficient angles are also continuously increased, and thus it is difficult to observe the minimum coefficient angle. If one can compute 2nk and restrict it to an index within N/2 (i.e., restricting the angle within $\pi/2$) for different k, a set of index values F(n, k) can be fixed to determine fixed-coefficient angles. Taking N=5 as an example (because $W_N^{n0}=1$ and $W_N^{0k}=1$, there is no need to discuss k=0 and n=0 as the negative sign of even/odd function is also not considered temporarily), we have:

$$k=1, W_N^{2nk}=\{W_5^2 W_5^4 W_5^6 W_5^8\}$$

$$k=2, W_N^{2nk}=\{W_5^4 W_5^8 W_5^{12} W_5^{16}\}$$

$$k=3, W_N^{2nk}=\{W_5^6 W_5^{12} W_5^{18} W_5^{24}\}$$

$$k=4, W_N^{2nk}=\{W_5^8 W_5^{16} W_5^{24} W_5^{32}\}, \quad (16)$$

In equation (16), in order find a set of fixed coefficient $W_N^{F(n,k)}$, modulo operation is required to compute F(n, k). From equations (14a) and (14d), it first restricts the angle of $W_N^{2nk}$ in equation (16) within $2\pi$, wherein 2nk must be smaller than 2N, as follows:

$$\{W_5^2\ W_5^4\ W_5^6\ W_5^8\} \xrightarrow{\mathrm{mod}(2nk,\ 2N)} \{W_5^2\ W_5^4\ W_5^6\ W_5^8\}$$
$$\{W_5^4\ W_5^8\ W_5^{12}\ W_5^{16}\} \xrightarrow{\mathrm{mod}(2nk,\ 2N)} \{W_5^4\ W_5^8\ W_5^2\ W_5^6\}$$
$$\{W_5^6\ W_5^{12}\ W_5^{18}\ W_5^{24}\} \xrightarrow{\mathrm{mod}(2nk,\ 2N)} \{W_5^6\ W_5^2\ W_5^8\ W_5^4\}$$
$$\{W_5^8\ W_5^{16}\ W_5^{24}\ W_5^{32}\} \xrightarrow{\mathrm{mod}(2nk,\ 2N)} \{W_5^8\ W_5^6\ W_5^4\ W_5^2\}. \quad (17)$$

Further, an absolute module is defined as:

$$a\mathrm{mod}(o,\ p) \equiv \begin{cases} \mathrm{mod}(o,\ p), & \text{if } \mathrm{mod}(o,\ p) \leq p/2 \\ p - \mathrm{mod}(o,\ p), & \text{if } \mathrm{mod}(o,\ p) > p/2 \end{cases}. \quad (18)$$

Equation (18) depicts that the range of a mod(o, p) is restricted within p. If mod(o, p) is over p/2, mod(o, p) is subtracted back from p.

From equations (14b) and (14e), it restricts the angle of equation (17) within 0~π, and the angle of 2π~π is replaced with 0~π. Applying equation (18) to equation (17) for computation, where a mod(2nk, 2N) is smaller than N, we have:

$$\{W_5^2\ W_5^4\ W_5^6\ W_5^8\} \xrightarrow{a\mathrm{mod}(2nk,\ 2N)} \{W_5^2\ W_5^4\ W_5^1\ W_5^3\}$$
$$\{W_5^4\ W_5^8\ W_5^2\ W_5^6\} \xrightarrow{a\mathrm{mod}(2nk,\ 2N)} \{W_5^4\ W_5^3\ W_5^2\ W_5^1\}$$
$$\{W_5^6\ W_5^2\ W_5^8\ W_5^4\} \xrightarrow{a\mathrm{mod}(2nk,\ 2N)} \{W_5^1\ W_5^2\ W_5^3\ W_5^4\}$$
$$\{W_5^8\ W_5^6\ W_5^4\ W_5^2\} \xrightarrow{a\mathrm{mod}(2nk,\ 2N)} \{W_5^3\ W_5^1\ W_5^4\ W_5^2\}. \quad (19)$$

From equations (14c) and (14f), it restricts the angle of equation (19) within 0~π/2, and the angle of π~π/2 is replaced with 0~π/2. Another absolute module operation is performed on equation (19). Applying equation (18) to equation (19) for computation, where a mod(a mod(2nk, 2N), N) is smaller than N/2, we have:

$$\{W_5^2\ W_5^4\ W_5^1\ W_5^3\} \xrightarrow{a\mathrm{mod}(a\mathrm{mod}(2nk,\ 2N),\ N)} \{W_5^2\ W_5^1\ W_5^1\ W_5^2\}$$
$$\{W_5^4\ W_5^3\ W_5^2\ W_5^1\} \xrightarrow{a\mathrm{mod}(a\mathrm{mod}(2nk,\ 2N),\ N)} \{W_5^1\ W_5^2\ W_5^2\ W_5^1\}$$
$$\{W_5^1\ W_5^2\ W_5^3\ W_5^4\} \xrightarrow{a\mathrm{mod}(a\mathrm{mod}(2nk,\ 2N),\ N)} \{W_5^1\ W_5^2\ W_5^2\ W_5^1\}$$
$$\{W_5^3\ W_5^1\ W_5^4\ W_5^2\} \xrightarrow{a\mathrm{mod}(a\mathrm{mod}(2nk,\ 2N),\ N)} \{W_5^2\ W_5^1\ W_5^1\ W_5^2\}. \quad (20)$$

From equation (20), it can be found that, in the example of N=5, all coefficients of equation (15) reduce the angle range to be within π/2, represented as $W_S^1$ and $W_S^2$, after being processed by the fixed-coefficient algorithm. As symmetry exists in n=1~(N−1)/2 and n=(N+1)2~N−1, k=1~(N−1)/2 and k=(N+1)/2~N−1, index value F(n,k)={2 1; 1 2} can be selected. For convenience mathematics verification, coefficient $\{W_S^1\ W_S^2\}$ for k=(N−1)/2 is selected as fixed coefficient.

In view of the aforementioned description, the coefficient symmetry can be depicted from the following Table 1 and Table 2.

TABLE 1

| cosine coefficient symmetry relation | | | | |
|---|---|---|---|---|
| $\cos(2nk\theta)$ | | n | | |
| $\theta = \pi/N$ | 1 | (N − 1)/2 | (N + 1)/2 | N − 1 |
| 0 | 0 | 0 | 0 | 0 |
| 1 | $\cos(2\theta)$ | $\cos((N-1)\theta)$ | $\cos((N+1)\theta)$ | $\cos(2(N-1)\theta)$ |
| ... | ... | ... | ... | ... |
| (N − 1)/2 | $\cos((N-1)\theta)$ | $\cos\left(\frac{(N-1)^2\theta}{2}\right)$ | $\cos\left(\frac{(N^2-1)\theta}{2}\right)$ | $\cos((N-1)2\theta)$ |
| (N + 1)/2 | $\cos((N+1)\theta)$ | $\cos\left(\frac{(N^2-1)\theta}{2}\right)$ | $\cos\left(\frac{(N+1)^2\theta}{2}\right)$ | $\cos((N2-1)\theta)$ |
| ... | ... | ... | ... | ... |
| N − 1 | $\cos(2(N-1)\theta)$ | $\cos((N-1)2\theta)$ | $\cos((N2-1)\theta)$ | $\cos(2(N-1)2\theta)$ |

TABLE 2

| sine coefficient symmetry relation | | | | |
|---|---|---|---|---|
| $\sin(2nk\theta)$ | | n | | |
| $\theta = \pi/N$ | 1 | (N − 1)/2 | (N + 1)/2 | N − 1 |
| 0 | 0 | 0 | 0 | 0 |
| 1 | $\sin(2\theta)$ | $\sin((N-1)\theta)$ | $\sin((N+1)\theta)$ | $\sin(2(N-1)\theta)$ |
| ... | ... | ... | ... | ... |
| (N − 1)/2 | $\sin((N-1)\theta)$ | $\sin\left(\frac{(N-1)^2\theta}{2}\right)$ | $\sin\left(\frac{(N^2-1)\theta}{2}\right)$ | $\sin((N-1)2\theta)$ |
| (N + 1)/2 | $\sin((N+1)\theta)$ | $\sin\left(\frac{(N^2-1)\theta}{2}\right)$ | $\sin\left(\frac{(N+1)^2\theta}{2}\right)$ | $\sin((N2-1)\theta)$ |
| ... | ... | ... | ... | ... |
| N − 1 | $\sin(2(N-1)\theta)$ | $\sin((N-1)2\theta)$ | $\sin((N2-1)\theta)$ | $\sin(2(N-1)2\theta)$ |

In table 1, k=1~(N−1)/2 and k=(N+1)/2~N−1 are symmetric with each other, and n=1~(N−1)/2 and n=(N+1)/2~N−1 are symmetric with each other. In addition to k=0 and n=0, the remaining coefficients have vertical/horizontal mirror symmetry relation. The symmetry of sine function in table 2 is of horizontal/vertical mirror symmetry relation.

Figure 4:
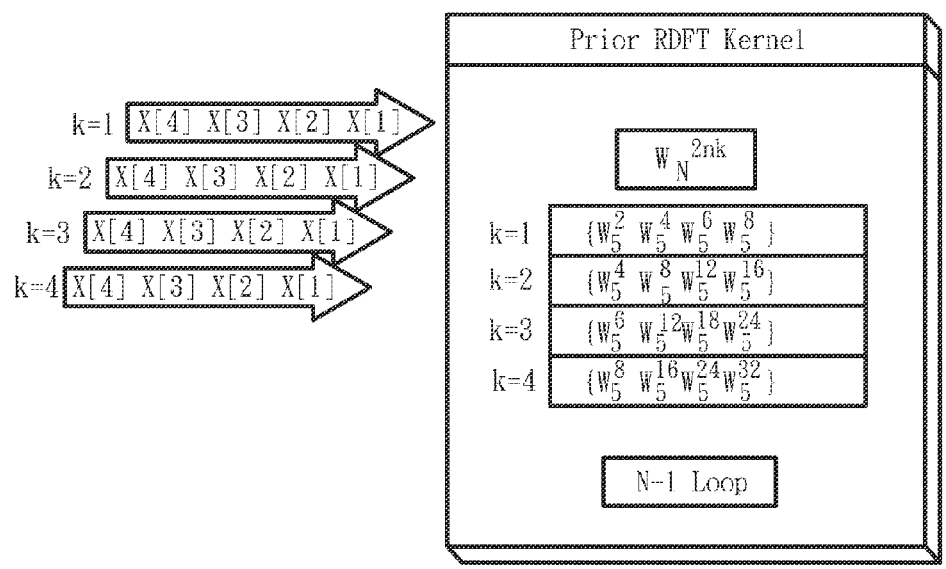
FIG. 4 schematically illustrates prior RDFT computation.

In the original MT mathematics model of equation (1), one set of input signals x[n] is multiplied with different combination of coefficient $W_N^{2nk}$ for computing each point k, as shown in FIG. 4. On the contrary, after performing a fixed-coefficient algorithm on coefficients, the coefficients do not change due to k, but are fixed as one set $W_N^{F(n,(N-1)/2)}$. Therefore, the input signal x[n] must be pre-processed based on the coefficient index value F(n, k) for being correspondingly re-permuted as $R_k[u]$, as shown in FIG. 5.

Figure 5:
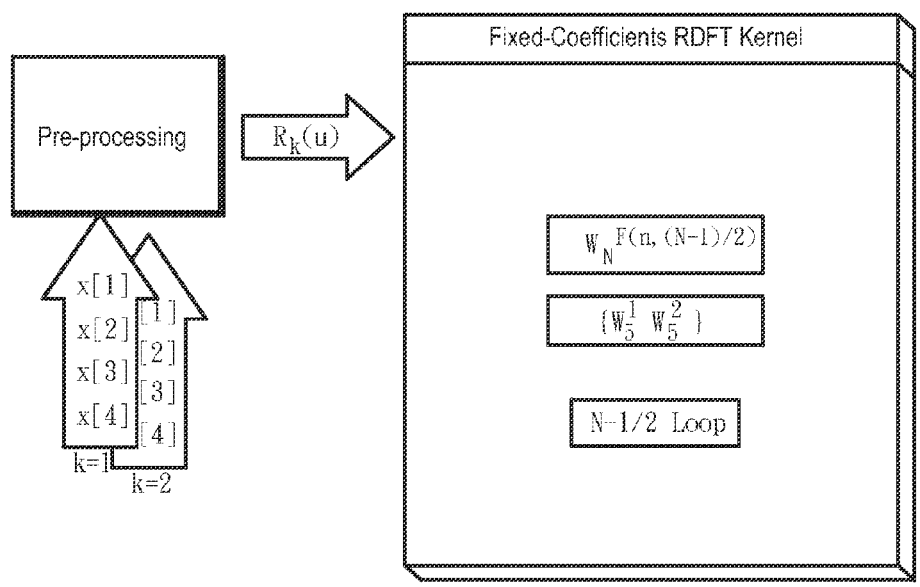
FIG. 5 schematically illustrates the fixed-coefficient RDFT computation in accordance with the present invention.

In FIG. 5, the operation of pre-processing includes three part: (1) performing an modulo operation on the coefficient angle to determine the coefficient index value F(n, k); (2) redefining the operation of original input signals x[n+1] and x[N−1−n] as N[n] because equations (8a) and (8b) have proved the symmetry of coefficient; (3) applying F(n, k) in (1)

to the result of (2) for generating a new sequence $R_k[u]$ as follows:

$$R_k[u]=U[F(n,k)]. \tag{21}$$

Therefore, when N=5, input x[n] is re-permuted, after being pre-processed, as:

$$R_k[u] = \begin{bmatrix} U[2] & U[1] \\ U[1] & U[2] \end{bmatrix}. \tag{22}$$

$R_k[u]$ permuted by equation (21) is sequentially inputted to a fixed-coefficient RDFT kernel architecture for computation. The exhibition in FIG. 5 is simply a concept figure in view of mathematics model. In the actual fixed-coefficient RDFT kernel circuit architecture, the required fixed angle will be determined by the fixed-coefficient prime length RDFT.

By first respectively deriving the recursive coefficients $C_N^{(n+1)k}$, $S_N^{(n+1)k}$ of equation (10) and then using the cosine and sine periodic characteristics equations (14a) and (14d), we have:

$$C_N^{(n+1)k} = \cos\left(\frac{2(n+1)k\pi}{N}\right) = \cos\left(\frac{\mathrm{mod}(2(n+1)k, 2N)\pi}{N}\right), \tag{23a}$$
$$k = 1, 2, \ldots \frac{N-1}{2}, n = 0, 1, \ldots \frac{N-1}{2} - 1,$$

$$S_N^{(n+1)k} = \sin\left(\frac{2(n+1)k\pi}{N}\right) = \sin\left(\frac{\mathrm{mod}(2(n+1)k, 2N)\pi}{N}\right), \tag{23b}$$
$$k = 1, 2, \ldots \frac{N-1}{2}, n = 0, 1, \ldots \frac{N-1}{2} - 1,$$

Equations (23a) and (23b) represent that $$\cos\left(\frac{2(n+1)k\pi}{N}\right) \text{ and } \sin\left(\frac{2(n+1)k\pi}{N}\right)$$

are reduced to be within the angle of $0\sim2\pi$, wherein "mod" indicates a module operation. Then, using the periodic characteristics equations (14b) and (14e) in combination with equation (18), equations (23a) and (23b) can be respectively expressed as:

$$\cos\left(\frac{\mathrm{mod}(2(n+1)k, 2N)\pi}{N}\right) = \cos\left(\frac{a\mathrm{mod}(2(n+1)k, 2N)\pi}{N}\right), \tag{24a}$$

$$\sin\left(\frac{\mathrm{mod}(2(n+1)k, 2N)\pi}{N}\right) = (-1)^S \times \sin\left(\frac{a\mathrm{mod}(2(n+1)k, 2N)\pi}{N}\right), \tag{24b}$$

where $$a\mathrm{mod}(2(n+1)k, 2N) \equiv \tag{25}$$
$$\begin{cases} \mathrm{mod}(2(n+1)k, 2N), & \text{if } \mathrm{mod}(2(n+1)k, 2N) \leq N \\ 2N - \mathrm{mod}(2(n+1)k, 2N), & \text{if } \mathrm{mod}(2(n+1)k, 2N) > N \end{cases},$$

and $$S = \begin{cases} 0, & \text{if } a\mathrm{mod}(2(n+1)k, 2N) \leq N \\ 1, & \text{if } a\mathrm{mod}(2(n+1)k, 2N) > N \end{cases}. \tag{26}$$

Equations (24a) and (24b) imply that the angle within $\pi\sim2\pi$ is expressed by $\pi\sim\pi$. For equation (26), because the sine function is an odd function as depicted from FIG. 2, the sine function value of $\pi\sim2\pi$ must be multiplied with a negative sign when the angle is over $\pi$. The periodic characteristics equations (14c) and (14f) are used again and equation (25) further performs an a mod operation, equations (24a) and (24b) can be rewritten as:

$$\cos\left(\frac{a\mathrm{mod}(2(n+1)k, 2N)\pi}{N}\right) = \tag{27a}$$
$$(-1)^C \times \cos\left(\frac{a\mathrm{mod}(a\mathrm{mod}(2(n+1)k, 2N), N)\pi}{N}\right),$$

$$(-1)^S \times \sin\left(\frac{a\mathrm{mod}(2(n+1)k, 2N)\pi}{N}\right), \tag{27b}$$

$$= (-1)^S \times \sin\left(\frac{a\mathrm{mod}(a\mathrm{mod}(2(n+1)k, 2N), N)\pi}{N}\right),$$

where $$a\mathrm{mod}(a\mathrm{mod}(2(n+1)k, 2N), N) \equiv \tag{28}$$
$$\begin{cases} a\mathrm{mod}(2(n+1)k, 2N), & \text{if } a\mathrm{mod}(2(n+1)k, 2N) \leq N/2 \\ 2N - a\mathrm{mod}(2(n+1)k, 2N), & \text{if } a\mathrm{mod}(2(n+1)k, 2N) > N/2 \end{cases},$$

and $$C = \begin{cases} 0, & \text{if } a\mathrm{mod}(a\mathrm{mod}(2(n+1)k, 2N), N) \leq N/2 \\ 1, & \text{if } a\mathrm{mod}(a\mathrm{mod}(2(n+1)k, 2N), N) > N/2 \end{cases}. \tag{29}$$

Equations (27a) and (27b) imply that the angle within $\pi/2\sim\pi$ is expressed by $0\sim\pi/2$. For equation (29), because the cosine function is an even function as depicted from FIG. 3, the cosine function value of $\pi/2\sim\pi$ must be multiplied with a negative sign when the angle is over $\pi/2$.

Because N is a prime number, a mod(a mod(2(n+1)k,2N), N) is an arbitrary number except 0, and thus a mod(a mod(2 (n+1)k,2N),N) can be expressed as a new index:

$$F(n,k) = a\mathrm{mod}(a\mathrm{mod}(2(n+1)k, 2N), N), \tag{30a}$$

where the index value belonged to the fixed coefficient is F(n,(N−1)/2), which is re-defined as:

$$u+1 = F(n,(N-1)/2). \tag{30b}$$

From this result, equation (8) can be derived by equations (23a) to (30b) as follows:

$$X[k] = \tag{31a}$$
$$x[0] + \sum_{u=0}^{R-1} C_k[u] \cdot \cos\left(\frac{(u+1)\pi}{N}\right) - j\sum_{u=0}^{R-1} S_k[u] \cdot \sin\left(\frac{(u+1)\pi}{N}\right),$$

where $$X_{DCT}[k] = \tag{31b}$$
$$x[0] + \sum_{u=0}^{R-1} C_k[u] \cdot \cos\left(\frac{(u+1)\pi}{N}\right) = x[0] + \sum_{u=0}^{R-1} C_k[u] \cdot \cos((u+1)\theta),$$

$$X_{DST}[k] = \sum_{u=0}^{R-1} S_k[u] \cdot \sin\left(\frac{(u+1)\pi}{N}\right) = \sum_{u=0}^{R-1} S_k[u] \cdot \sin((u+1)\theta), \tag{31c}$$

and $$C_k[u] = (-1)^C \times c[F(n,k)], \tag{31d}$$

$$S_k[u] = (-1)^S \times s[F(n,k)], \tag{31e}$$

$$\theta = \frac{\pi}{N}.$$

Equations (31d) and (31e) are new inputs permuted by c[n] and s[n] of equations (8b) and (8c) according to the coefficient index value F(n, k).

After deriving the fixed-coefficient mathematics model, equations (31b) and (31c) are continuously derived to be recursive mathematics equations, which are processed by z-transform to illustrate the circuit architecture.

The recursive architecture for DCT part is first derived. By substituting the variable u in equation (31b) with $$u = \frac{(N-1)}{2} - 1 - u$$

and applying addition formula of trigonometric function to the cosine function, we have:

$$X_{DCT}[k] = x[0] + \sum_{u=0}^{R-1} C_k\left[\frac{(N-1)}{2} - 1 - u\right] \cdot \cos\left(\left(\frac{(N-1)}{2} - u\right)\theta\right) \quad (32)$$

$$= x[0] + \sum_{u=0}^{R-1} C_k\left[\frac{(N-1)}{2} - 1 - u\right] \cdot \left(\cos\left(\frac{N}{2}\theta\right) \cdot \cos\left(\left(u + \frac{1}{2}\right)\theta\right) + \sin\left(\frac{N}{2}\theta\right) \cdot \sin\left(\left(u + \frac{1}{2}\right)\theta\right)\right).$$

$\left(\frac{(N-1)}{2} - 1\right.$ is expressed by $i$ for convenient derivation$\left.\right)$ $$= x[0] + \sum_{u=0}^{i} C_k[i-u] \cdot \sin\left(u + \frac{1}{2}\right)\theta$$

$$= x[0] + C_k[i] \cdot \sin\frac{\theta}{2} + \sum_{u=0}^{i-1} C_k[i-1-\theta] \cdot \sin\left(u + \frac{3}{2}\right)\theta$$

$$= x[0] + L_i(k),$$

where $$L_i(k) = C_k[i] \cdot \sin\frac{\theta}{2} + \sum_{u=0}^{i-1} C_k[i-1-\theta] \cdot \sin\left(u + \frac{3}{2}\right)\theta. \quad (33)$$

Chebyshev polynomials are defined as follows:

$$\sin(r\theta) - 2\sin(r-1)\theta \cdot \cos\theta - \sin(r-2)\theta, \quad (34a)$$

$$\cos(r\theta) - 2\cos(r-1)\theta \cdot \cos\theta - \cos(r-2)\theta, \quad (34b)$$

Next, the recursive coefficient $$\sin\left(u + \frac{3}{2}\right)\theta$$

in equation (33) is applied with Chebyshev polynomials to obtain:

$$L_i(k) = C_k[i] \cdot \sin\frac{\theta}{2} + \sum_{u=0}^{i-1} C_k[i-1-u] \cdot \quad (35)$$

$$\left[2\sin\left(\left(u + \frac{1}{2}\right)\theta\right) \cdot \cos\theta - \sin\left(\left(u - \frac{1}{2}\right)\theta\right)\right]$$

$$= C_k[i] \cdot \sin\frac{\theta}{2} - C_k[i-1] \cdot \sin\left(-\frac{\theta}{2}\right) + 2\cos\theta \cdot$$

$$\sum_{u=0}^{i-1} C_k[i-1-u] \cdot \sin\left(u + \frac{1}{2}\right)\theta -$$

$$\sum_{u=0}^{i-2} C_k[i-2-u] \cdot \sin\left(u + \frac{1}{2}\right)\theta$$

$$= \sin\frac{\theta}{2}(C_k[i] + C_k[i-1]) + 2\cos\theta \cdot L_{i-1}(k) - L_{i-2}(k).$$

Equation (35) is then processed by z-transform to obtain:

$$H(z) = \frac{L_i(k,z)}{C_k(z)} \quad (36)$$

$$= \frac{\sin\frac{\theta}{2}(1 + z^{-1})}{1 - 2\cos\theta z^{-1} + z^{-2}}.$$

Figure 6:
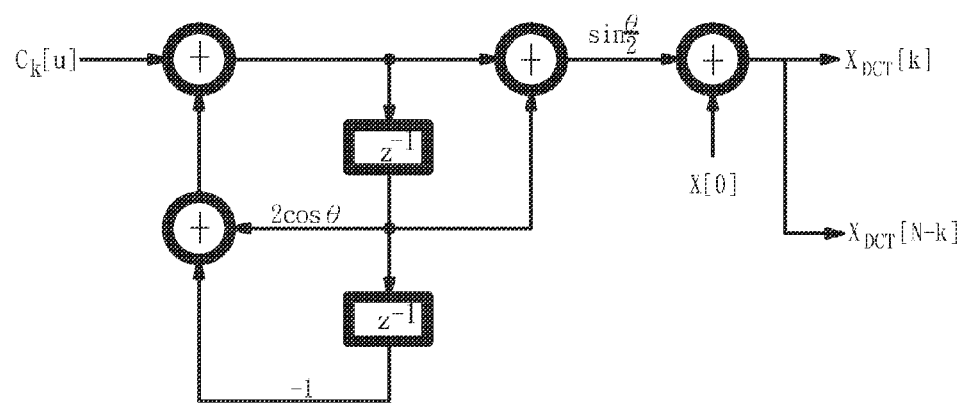
FIG. 6 schematically illustrates the DCT hardware circuit architecture of prime; length RDFT.

From equations (32), (35) and (36), the DCT hardware circuit architecture of prime length RDFT can be obtained, as shown in FIG. 6.

In FIG. 6, $C_k[u]$ that has been permuted by the pre-processing is inputted to the DCT recursive circuit architecture for being repeatedly multiplied with the fixed coefficient in the kernel recursive process. In the process of deriving equation (31b) toward recursive mathematics formula, it is able to determine the fixed coefficient of 2 cos θ implemented in a circuit architecture, wherein the fixed angle $$\theta = \frac{\pi}{N}$$

is unrelated to the spectral coefficient of externally computed k-th point. Similarly, in equation (32), the result after recursive operation is added with x[0] to generate the spectral coefficient operation of two points of DCT for one time.

In continuing to derive the recursive architecture of DST part, similarly, the variable u in equation (31c) is substituted with $$u = \frac{(N-1)}{2} - 1 - u,$$

and the addition formula of trigonometric function is applied to the sine function, so as to have:

$$X_{DST}[k] = \sum_{u=0}^{R-1} S_k\left[\frac{(N-1)}{2} - 1 - u\right] \cdot \sin\left(\left(\frac{(N-1)}{2} - u\right)\theta\right) \quad (37)$$

$$= \sum_{u=0}^{R-1} S_k\left[\frac{(N-1)}{2} - 1 - u\right] \cdot$$

$$\left(\sin\left(\frac{N}{2}\theta\right) \cdot \cos\left(\left(u + \frac{1}{2}\right)\theta\right) - \cos\left(\frac{N}{2}\theta\right) \cdot \sin\left(\left(u + \frac{1}{2}\right)\theta\right)\right)$$

$\left(\text{by using } j \text{ to represent } \frac{(N-1)}{2} - 1\right)$

-continued $$= \sum_{u=0}^{j} S_k[j-u] \cdot \cos\left(u+\frac{1}{2}\right)\theta$$

$$= S_k[j] \cdot \cos\frac{\theta}{2} + \sum_{u=0}^{j-1} S_k[j-1-\theta] \cdot \cos\left(u+\frac{3}{2}\right)\theta$$

$$= M_j(k).$$

Then, Chebyshev polynomials in equation (37) is applied to the recursive coefficient $$\cos\left(u+\frac{3}{2}\right)\theta$$

in equation (37), so as to have:

$$M_j(k) = S_k[j] \cdot \cos\frac{\theta}{2} + \sum_{u=0}^{j-1} S_k[j-1-u] \cdot \qquad (38)$$

$$\left[2\cos\left(\left(u+\frac{1}{2}\right)\theta\right) \cdot \cos\theta - \cos\left(\left(u-\frac{1}{2}\right)\theta\right)\right]$$

$$= S_k[j] \cdot \cos\frac{\theta}{2} - S_k[j-1] \cdot \cos\left(-\frac{\theta}{2}\right) + 2\cos\theta \cdot$$

$$\sum_{u=0}^{j-1} S_k[j-1-u] \cdot \cos\left(u+\frac{1}{2}\right)\theta - \sum_{u=0}^{j-2} S_k[j-2-u] \cdot$$

$$\cos\left(u+\frac{1}{2}\right)\theta$$

$$= \cos\frac{\theta}{2}(S_k[j] + S_k[j-1]) + 2\cos\theta \cdot M_{j-1}(k) - M_{j-2}(k).$$

After performing z-transform on equation (38), we have:

$$H(z) = \frac{M_j(k,z)}{S_k(z)} \qquad (39)$$

$$= \frac{\cos\frac{\theta}{2}(1-z^{-1})}{1-2\cos\theta z^{-1}+z^{-2}}.$$

Figure 7:
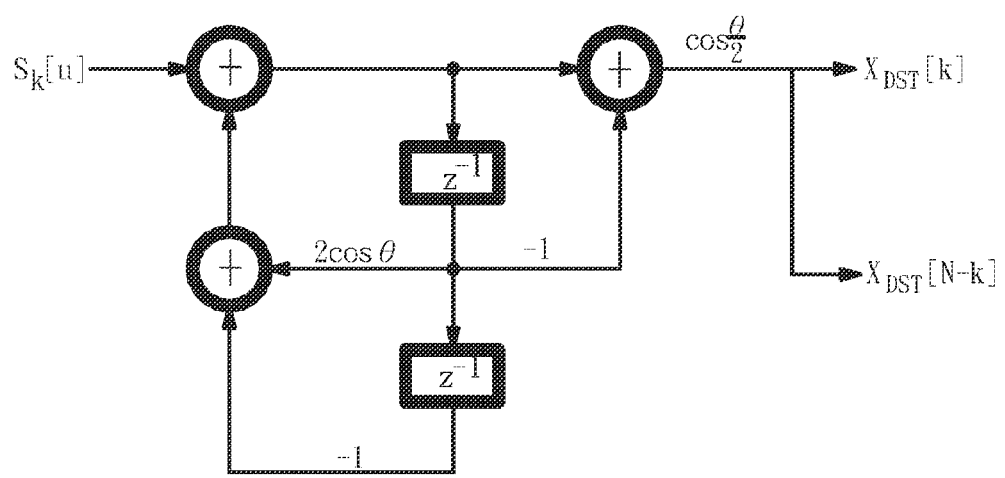
FIG. 7 schematically illustrates the DST hardware circuit architecture of prime length RDFT.

From equations (38) and (39), the DST hardware circuit architecture of prime length RDFT can be obtained as shown in FIG. 7.

The architecture of FIG. 7 is similar to the DCT recursive kernel architecture of FIG. 6, except that there is no extra addition signal after the recursive operation is completed, so as to complete DCT operation.

Figure 8:
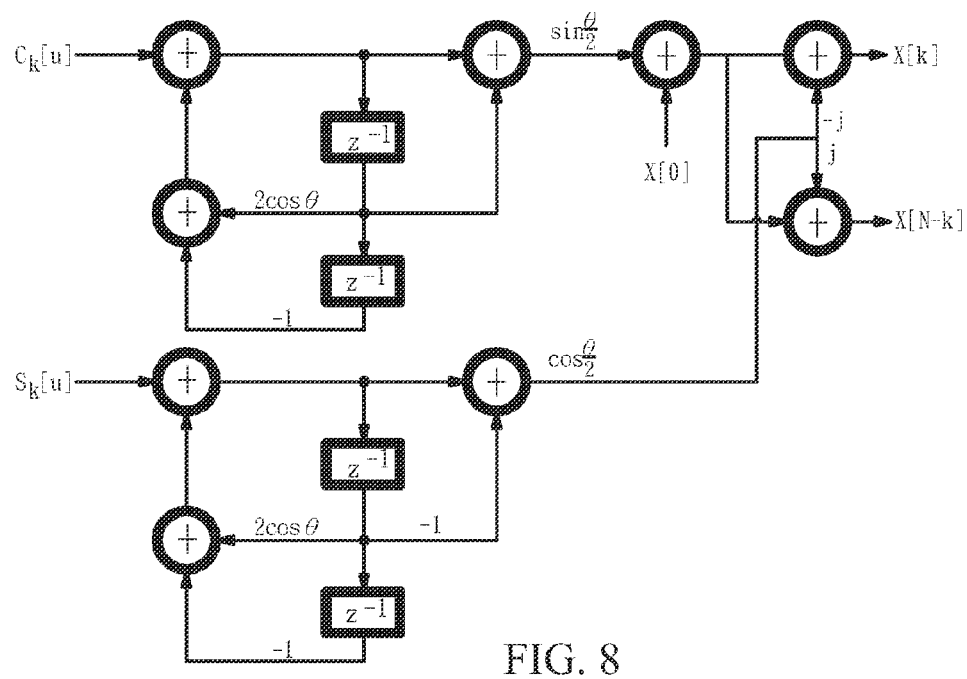
FIG. 8 schematically illustrates the computation of RDFT circuit architecture by combining FIG. 6 and FIG. 7.

By combining the architectures of FIG. 6 and FIG. 7, the computation of RDFT circuit architecture is completed, as shown in FIG. 8.

In FIG. 8, for the convenience of corresponding to equation (31a), the two adders at the output stage and the part multiplied with j are actually not existed in circuit implementation.

From the derivation of the aforementioned mathematic equations, it is known that the coefficient angle in the fixed-coefficient prime length RDFT circuit architecture is only $$\theta = \frac{\pi}{N}.$$

Therefore, the coefficient value is directly written into the circuit in circuit implementation, so as to completely save the coefficient ROM in the circuit.

Although the use of fixed-coefficient algorithm only can save the coefficient ROM, its precision may be greatly decreased. Therefore, it is desired to solve this problem for increasing the precision.

The aforementioned description has introduced the result and advantage of the fixed-coefficient algorithm. However, it also causes a negative influence in that equations (36) and (39) may affect the root of each polynomial due to quantization error, while the pole point and the zero point are closely related to the system sensitivity. When quantizing the coefficients of a rational system function or corresponding differential equation, the zero/pole point of system function on a plane will move to a new position. If the system is implemented to have a high sensitivity for coefficient disturbance, the resulted system will no longer satisfy the original design index, or even one IIR system may become unstable.

The present invention introduces q factor and derives equation (31a) to achieve the purpose of increasing precision.

In the process of sampling, the continuous and variable analog signal has to be represented by a digitized value. Such a process will cause a so-called quantization error. The quantization error refers to the difference between the amplitude of actual signal (with infinite precision) and the digitized value (with limited precision). If the digital signal is resumed to an analog signal, the quantization error is the so-called distortion. The quantization error may be decreased by increasing the sampling rate; i.e., the use of more bits to represent the value of a digitized signal, so as to increase the precision. In implementing such a method using increased number of bits to accommodate a more precise value, the circuit area has to be increased, which is not satisfactory to the current trend of pursuing compact and beauty.

The quantization error in IIR (Infinite impulse response) filter may have another influence which causes the zero/pole point of the system to be offset. The error of all coefficients in a polynomial will influence the root of each polynomial. Therefore, each pole point and zero point will be influenced by all quantization errors in denominator and numerator polynomials. If pole points (or zero points) are tightly concentrated, the small error on denominator (numerator) coefficient may cause a large offset to the pole point (or zero point) for the direct form structure. Therefore, if these pole points (zero points) are tightly concentrated, one can estimate that the pole point of the direct form structure is very sensitive to the coefficient quantization error. Taking the direct form IIR filter system function as an example, the transfer function is:

$$H(z) = \frac{\sum_{k=0}^{M} b_k z^{-k}}{1 - \sum_{k=1}^{N} a_k z^{-k}} \qquad (40)$$

$$= \frac{B(z)}{A(z)}.$$

In equation (40), coefficients $a_k$ and $b_k$ are non-quantized idea coefficient values with infinite precision, wherein, in view of the concept of factorization, the denominator part A(z) of equation (40) can be expressed as:

$$A(z) = 1 - \sum_{k=1}^{N} a_k z^{-k} \qquad (41)$$

$$= \prod_{k=1}^{N} (1 - z_k z^{-1}).$$

From equation (41), the idea pole point $z_k$ of this system function can be obtained. If the coefficients $a_k$ and $b_k$ in equation (40) are quantized, it is able to obtain the quantized system function as follows:

$$\hat{H}(z) = \frac{\sum_{k=0}^{M} \hat{b}_k z^{-k}}{1 - \sum_{k=1}^{N} \hat{a}_k z^{-k}} \qquad (42a)$$

$$= \frac{\hat{B}(z)}{\hat{A}(z)},$$

where $$\hat{a}_k = a_k + \Delta a_k, \qquad (42b)$$

$$\hat{b}_k = b_k + \Delta b_k. \qquad (42c)$$

What causes the pole point to change is the coefficient error $\Delta a_k$. If the denominator part $\hat{A}(z)$ of equation (42a) is decomposed, we have:

$$\hat{A}(z) = 1 - \sum_{k=1}^{N} \hat{a}_k z^{-k} \qquad (43a)$$

$$= \prod_{k=1}^{N} (1 - \hat{z}_k z^{-1}),$$

where $$\hat{z}_k = z_k + \Delta z_k. \qquad (43b)$$

From equation (41), the pole point of coefficients after quantization is $\hat{z}_k$, and its pole point offset is $\Delta z_k$. From equations (42a) to (43b), it is known that the error $\Delta a_k$ generated from quantizing coefficients will result in a pole point position offset $\Delta z_k$. Therefore, the present invention makes use of the pole point position variation (pole point sensitivity) caused by the change of coefficients to describe the influence of coefficient quantization error.

From equation (43a), it is known that the pole point $z_k$ will be influenced by the quantization error $\Delta a_k$ of all coefficients $\{a_1, a_2, \ldots, a_N\}$, resulting in a pole point offset $\Delta z_k$, as follows:

$$\Delta z_k = \frac{\partial z_k}{\partial a_1} \Delta a_1 + \frac{\partial z_k}{\partial a_2} \Delta a_2 + \ldots + \frac{\partial z_k}{\partial a_N} \Delta a_N = \sum_{i=1}^{N} \frac{\partial z_k}{\partial a_i} \Delta a_i, \qquad (44)$$

$$k = 1, 2, \ldots, N.$$

From equation (44), it is known that $$\frac{\partial z_k}{\partial a_i}$$

determines the degree of pole point position offset caused by the coefficient quantization error. Therefore, $$\frac{\partial z_k}{\partial a_i}$$

represents the pole point sensitivity. Next, from the system pole point polynomial $A(z)$ of equation (41), it is able to derive the pole point sensitivity $$\frac{\partial z_k}{\partial a_i}.$$

By performing partial differentiation to each coefficient $a_i$ for the pole point polynomial $A(z)$, we have:

$$\frac{\partial A(z)}{\partial a_i} = \frac{\partial A(z)}{\partial z_k} \frac{\partial z_k}{\partial a_i} \qquad (45)$$

$$\frac{\partial z_k}{\partial a_i} = \frac{\partial A(z)}{\partial a_i} \bigg/ \frac{\partial A(z)}{\partial z_k},$$

where $$\frac{\partial A(z)}{\partial a_i} = -z^{-i}, \qquad (46a)$$

$$\frac{\partial A(z)}{\partial z_k} = -z^{-1} \prod_{\substack{i=1 \\ i \neq k}}^{N} (1 - z_i z^{-1}). \qquad (46b)$$

By applying the result of equations (46a) and (46b) to equation (45), we have:

$$\frac{\partial z_k}{\partial a_i} = \frac{-z^{-i}}{-z^{-1} \prod_{\substack{i=1 \\ i \neq k}}^{N} (1 - z_i z^{-1})} \qquad (47)$$

$$= \frac{z^{N-i}}{\prod_{\substack{i=1 \\ i \neq k}}^{N} (z - z_i)} \bigg|_{z=z_k}$$

$$= \frac{z_k^{N-i}}{\prod_{\substack{i=1 \\ i \neq k}}^{N} (z_k - z_i)}.$$

In equation (47), the denominator product $(z_k - z_i)$ represents the distance from the pole point $z_k$ to another pole point $z_i$. Therefore, when the pole points are getting denser, the pole point sensitivity is increased. On the plane of polar coordinates, when the farthest distance between two pole points in a unit circle is a difference of it angle in phase, the sensitivity is minimum and the precision is thus increased. Therefore, if each pole point in the pole point polynomial of the system function is adjusted to have a farthest distance, the precision of the filter can be effectively increased.

With the derived relation between the pole point and the system sensitivity, the present invention makes use of q factor to solve the problem of low precision caused by fixed-coefficient algorithm, and accordingly presents a fixed-coefficient prime length RDFT circuit architecture improved by q factor.

First, the pole point polynomials in equations (36) and (39) are taken and defined as P(z) and the solution thereof is determined as follows;

$$P(z) = 1 - 2\cos\theta z^{-1} + z^{-2} \qquad (48)$$
$$= (z^{-1} - e^{\theta})(z^{-1} - e^{-\theta}).$$

From equation (48), two pole points are obtained as follows:

$$z_1 = e^{\theta}, \qquad (49a)$$

$$z_2 = e^{-\theta}, \qquad (49b)$$

where $$\theta = \frac{\pi}{N}.$$

Figure 9:
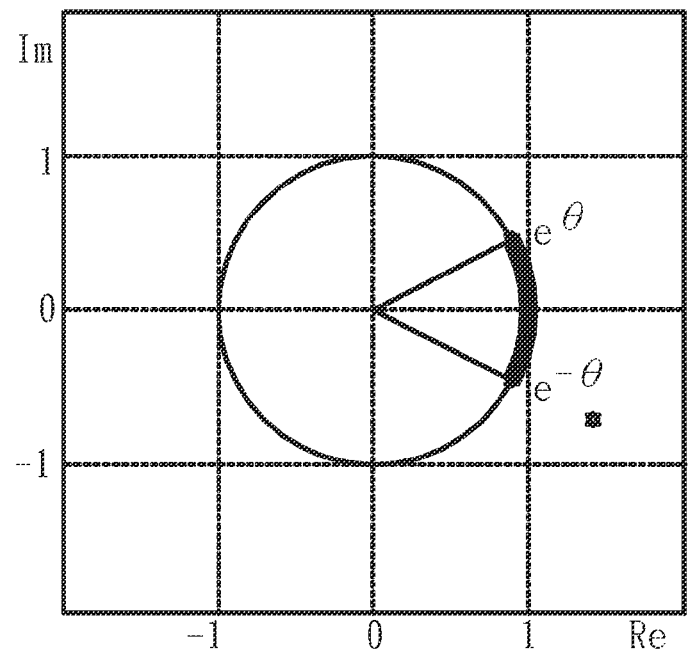
FIG. 9 schematically illustrates the pole point and its position and included angle on the coordinate plane.

Equations (49a) and (49b) are conjugate with each other, and the minimum radians difference is:

$$\varphi = \theta - (-\theta) \qquad (50)$$
$$= \frac{2\pi}{N},$$

while the pole point and its position and included angle on the coordinate plane are shown in FIG. 9.

Figure 10:
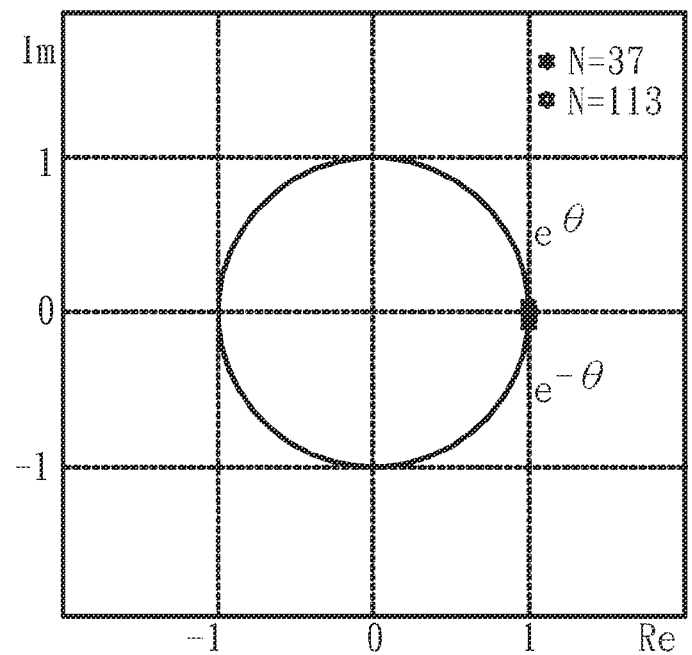
FIGS. 10 and 11 show the relation among the pole point position, the included angle and the number of points N.
Figure 11:
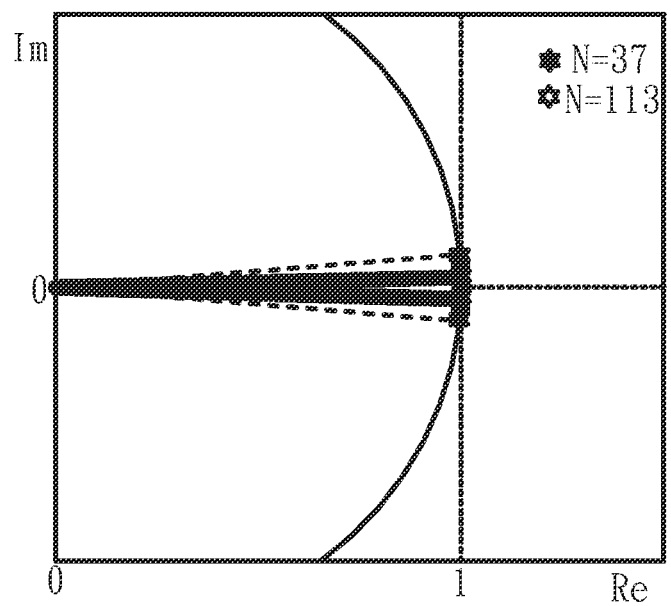

If the N in equation (50) is getting larger, φ is accordingly decreased. Based on equation (47), the distance between pole points is getting closer, resulting in increasing the sensitivity. FIG. 10 and FIG. 11 schematically illustrate the relation among pole point positions, included angle and number of points N when N=37 and N=113.

From FIG. 10 and FIG. 11, in the process of executing the fixed-coefficient algorithm, the range of representable coefficient angle θ is continuously reduced according to the coefficient symmetry, which results in that the pole points of the pole point polynomial P(z) are getting closer and thus the fixed-coefficient algorithm suffers from the drawback of low precision. Because the pole point for the coefficient after being quantized has such a feature, the present invention makes use of q factor to adjust the pole point position.

Since the positions of pole points are so close, the concept of q factor is to multiply the coefficient angle with a number to control each pole point to have the farthest distance, so as to improve the system precision. The following description depicts how to select the value of q factor.

When the farthest idea distance between two pole points is φ=π, the fixed-coefficient angle $\hat{\theta}$ after being adjusted by q factor is defined as $\hat{\theta}$, and equation (50) can be rewritten as:

$$\varphi = \hat{\theta} - (-\hat{\theta}) \qquad (51a)$$
$$= \pi.$$

From equation (51a), it is known that $\hat{\theta}$ has to be π/2:

$$\hat{\theta} = q \times \theta \qquad (51b)$$
$$= q \times \frac{\pi}{N}$$
$$= \frac{\pi}{2}.$$

In equation (51b), the idea value of q factor can be derived:

$$q = \frac{N}{2}. \qquad (51c)$$

In order to maintain congruence feature, q factor has to be co-prime with N. In the present invention, N is a prime number. Because a prime number is always co-prime with any positive integer, q can be an arbitrary positive integer. Based on the above reason, equation (51c) has to be rewritten as:

$$q = \frac{(N-1)}{2}. \qquad (51d)$$

In addition, applying equation (51d) back to equations (51a) and (51b), the radian between two pole points is:

$$\hat{\varphi} = \frac{(N-1)}{N}\pi. \qquad (51e)$$

Figure 12:
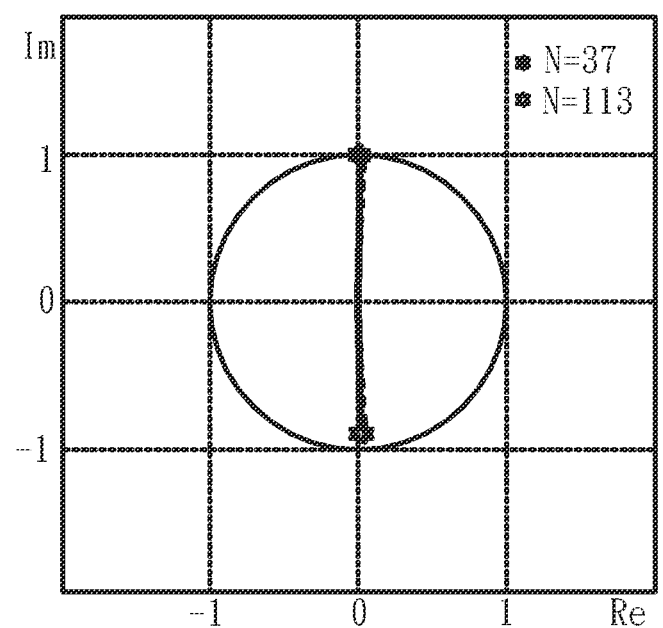
FIG. 12 schematically illustrates the relation among the pole point position, the included angle and the number of points N after adjustment with q factor.

From equation (51e), it can predict that, when the number of points N getting larger, $\hat{\varphi}$ and φ in equation (50) have better improved angles, and thus the improvement of prevision is obvious. By applying $\hat{\theta}$ multiplied with q factor back to equations (49a) and (49b), the improved pole point position and distance are obtained, as shown in FIG. 12. FIG. 12 schematically illustrates the relation among the pole point position, the included angle and the number of points N after adjustment with q factor.

After equation (51d) determines the q factor suitable for the present invention, the derivation starts from multiplying the coefficient angle values of $$\cos\left(\frac{(u+1)\pi}{N}\right) \text{ and } \sin\left(\frac{(u+1)\pi}{N}\right)$$

in equation (31a) with q factor. Equation (31a) is rewritten as:

$$X[k] = \qquad (52a)$$
$$x[0] + \sum_{u=0}^{R-1} C_k[u] \cdot \cos\left(\frac{(u+1)q}{N}\pi\right) - j\sum_{u=0}^{R-1} S_k[u] \cdot \sin\left(\frac{(u+1)q}{N}\pi\right),$$

where $X_{DCT}$, $X_{DST}$ are replaced with:

$$X_{DCT}[k] = x[0] + \sum_{u=0}^{R-1} C_k[u] \cdot \cos\left(\frac{(u+1)q}{N}\pi\right), \qquad (52b)$$

-continued $$X_{DST}[k] = \sum_{u=0}^{R-1} S_k[u] \cdot \sin\left(\frac{(u+1)q}{N}\pi\right), \quad (52c)$$

Because the coefficient angle in equation (52a) multiplied with q factor will have an angle value larger than π/2, this angle has to be performed with the fixed-coefficient algorithm again.

First, the DCT part of the recursive architecture is derived. From equation (52b), we have:

$$X_{DCT}[k] = x[0] + \sum_{u=0}^{R-1} C_k[u] \cdot \cos\left(\frac{(u+1)q}{N}\pi\right) \quad (53a)$$

$$= x[0] + \sum_{\hat{u}=0}^{R-1} C_k[\hat{u}] \cdot \cos\left(\frac{a\bmod(a\bmod((u+1)q, 2N), N)q}{N}\pi\right),$$

where $$C_k[\hat{u}] = (-1)^{C_m} \times C_k[\hat{F}(u)], \quad (53b)$$

and $$\hat{F}(u) = a\bmod(a\bmod((u+1)q, 2N), N), \quad (53c)$$

$$C_m = \begin{cases} 0, & \text{if } a\bmod(a\bmod((u+1)q, 2N), N) \leq N/2 \\ 1, & \text{if } a\bmod(a\bmod((u+1)q, 2N), N) > N/2 \end{cases}, \quad (53d)$$

Equation (53c) gives a new index value $\hat{F}(u)$ obtained from, after performing the previous fixed-coefficient algorithm, multiplying the coefficient index value u+1=F(n,(N−1)/2) of the k=(N−1)/2 row with q and then performing a fixed-coefficient algorithm for the second time. Equation (53b) permutes $C_k$ again according to this new index value and equation (53d).

Therefore, equation (53a) can be rearranged as follows:

$$X_{DCT}[k] = x[0] + \sum_{\hat{u}=0}^{R-1} C_k[\hat{u}] \cdot \cos((\hat{u}+1)\hat{\theta}), \quad (54)$$

where $$\hat{\theta} = q \times \frac{\pi}{N}.$$

Then, the variable û in equation (54) is replaced with $$\hat{u} = \frac{(N-1)}{2} - 1 - \hat{u},$$

and the addition formula of trigonometric function is applied to the cosine function, so as to obtain:

$$X_{DCT}[k] = x[0] + \sum_{\hat{u}=0}^{R-1} C_k\left[\frac{(N-1)}{2} - 1 - \hat{u}\right] \cdot \quad (55)$$

$$\left(\cos\left(\frac{N}{2}\hat{\theta}\right) \cdot \cos\left(\left(\hat{u}+\frac{1}{2}\right)\hat{\theta}\right) + \sin\left(\frac{N}{2}\hat{\theta}\right) \cdot \sin\left(\left(\hat{u}+\frac{1}{2}\right)\hat{\theta}\right)\right).$$

In the previous description, q factor can be an arbitrary integer, and thus equation (55) may produce different mathematic models due to q factor being an odd number of an even number. The following derivation is based on equation (55) for q of $X_{DCT}$ being an odd number and an even number, respectively.

When q factor is an odd number, equation (55) is rewritten and a recursive formula is derived as follows:

$$X_{DCT}[k] = x[0] \left| (-1)^{\frac{q-1}{2}} \times \sum_{\hat{u}=0}^{i} C_k[i-\hat{u}] \cdot \sin\left(\hat{u} + \frac{1}{2}\right)\theta \right. \quad (56)$$

$$= x[0] + (-1)^{\frac{q-1}{2}} \times$$

$$\left(C_k[i] \cdot \sin\frac{\hat{\theta}}{2} + \sum_{\hat{u}=0}^{i-1} C_k[i-1-\hat{u}] \cdot \sin\left(\hat{u} + \frac{3}{2}\right)\theta\right)$$

$$= x[0] + (-1)^{\frac{q-1}{2}} \times A_i(k),$$

where $$A_i(k) = C_k[i] \cdot \sin\frac{\hat{\theta}}{2} + \sum_{\hat{u}=0}^{i-1} C_k[i-1-\hat{u}] \cdot \sin\left(\hat{u} + \frac{3}{2}\right)\hat{\theta}, \quad (57)$$

$$i = \frac{(N-1)}{2} - 1.$$

Then, by applying Chebyshev polynomials in equation (34a) into $$\sin\left(\hat{u} + \frac{3}{2}\right)\hat{\theta}$$

of equation (57), the recursive computation formula $A_i(k)$ of DCT part is expanded, when q factor is an odd number, as follows:

$$A_i(k) = \sin\frac{\hat{\theta}}{2}(C_k[i] + C_k[i-1]) + 2\cos\hat{\theta} \cdot L_{i-1}(k) - L_{i-2}(k). \quad (58)$$

After performing z-transform on equation (58), we have:

$$H(z) = \frac{A_i(k, z)}{C_k(z)} = \frac{\sin\frac{\hat{\theta}}{2}(1 + z^{-1})}{1 - 2\cos\hat{\theta}z^{-1} + z^{-2}}. \quad (59)$$

Figure 13:
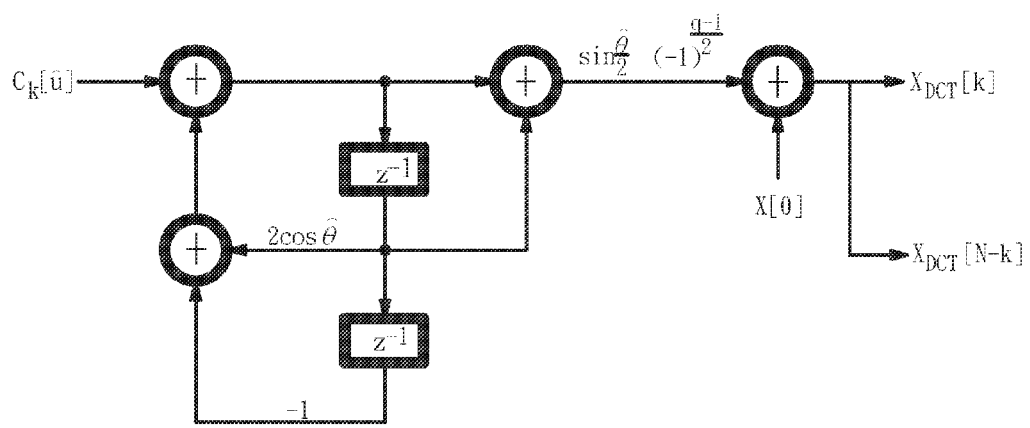
FIG. 13 schematically illustrates the DCT architecture of fixed-coefficient prime length RDFT when q is an odd number.

By comparing equation (36) with equation (59), it is known that the recursive architecture is not changed when q factor is an even number. However, when q factor is an odd number, it has to be multiplied with $$(-1)^{\frac{q-1}{2}}$$

after completing recursive operation for determining the positive or negative sign, as shown in FIG. 13. FIG. 13 schematically illustrates the DCT architecture of fixed-coefficient prime length RDFT when q is an odd number.

When q factor is an even number, equation (55) is rewritten and a recursive formula is derived as follows:

$$X_{DCT}[k] = x[0] + (-1)^{\frac{q}{2}} \times \sum_{\hat{u}=0}^{j} C_k[j-\hat{u}] \cdot \cos\left(\hat{u} + \frac{1}{2}\right)\hat{\theta} \quad (60)$$

$$= x[0] + (-1)^{\frac{q}{2}} \times$$

$$\left(C_k[j] \cdot \cos\frac{\hat{\theta}}{2} + \sum_{\hat{u}=0}^{j-1} C_k[j-1-\hat{u}] \cdot \cos\left(\hat{u} + \frac{3}{2}\right)\hat{\theta}\right)$$

$$= x[0] + (-1)^{\frac{q}{2}} \times B_j(k),$$

where $$B_j(k) = C_k[j] \cdot \cos\frac{\hat{\theta}}{2} + \sum_{\hat{u}=0}^{j-1} C_k[j-1-\hat{u}] \cdot \cos\left(\hat{u} + \frac{3}{2}\right)\hat{\theta}, \quad (61)$$

$$j = \frac{(N-1)}{2} - 1.$$

Next, by applying Chebyshev polynomials in equation (34a) into $$\cos\left(\hat{u} + \frac{3}{2}\right)\hat{\theta}$$

of equation (61), the recursive computation formula $B_j(k)$ of DCT part is expanded, when q factor is an even number, as follows:

$$B_j(k) = \cos\frac{\hat{\theta}}{2}(C_k[j] + C_k[j-1]) + 2\cos\hat{\theta} \cdot M_{j-1}(k) - M_{j-2}(k). \quad (62)$$

After performing z-transform on equation (62), we have:

$$H(z) = \frac{B_j(k,z)}{C_k(z)} = \frac{\cos\frac{\hat{\theta}}{2}(1-z^{-1})}{1 - 2\cos\hat{\theta}z^{-1} + z^{-2}}. \quad (63)$$

Figure 14:
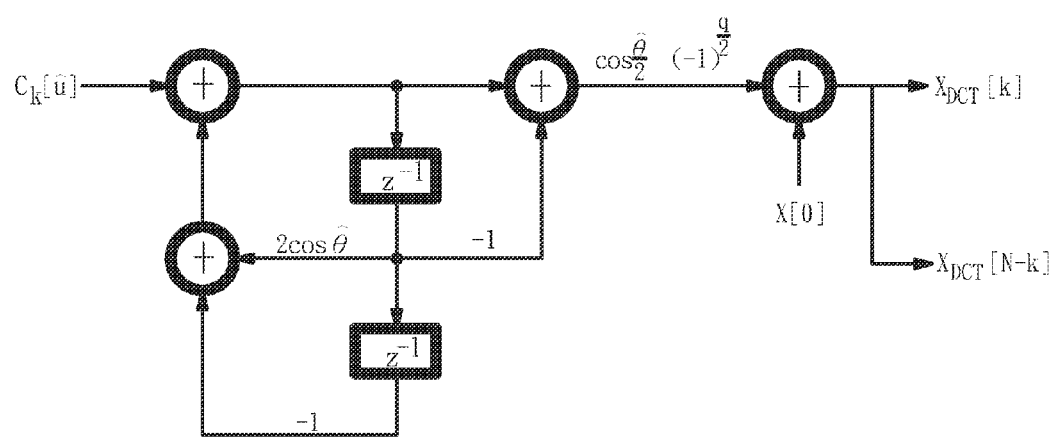
FIG. 14 schematically illustrates the DCT architecture of fixed-coefficient prime length RDFT when q is an even number.

From observing equation (63), it is known that, when q factor is an even number, the recursive architecture is almost the same as that of DST in equation (39) without q. The only difference is that positive/negative sign of $$(-1)^{\frac{q}{2}}$$

has to be multiplied at the end of recursive operation, as shown in FIG. 14. FIG. 14 schematically illustrates the DCT architecture of fixed-coefficient prime length RDFT when q is an even number.

For deriving the architecture of DST part, equation (52c) gives:

$$X_{DST}[k] = \sum_{u=0}^{R-1} S_k[u] \cdot \sin\left(\frac{(u+1)q}{N}\pi\right) \quad (64a)$$

$$= \sum_{\hat{u}=0}^{R-1} S_k[\hat{u}] \cdot \sin\left(\frac{amod(amod((u+1)q, 2N), N)\pi}{N}\right),$$

where $$S_k[\hat{u}] = (-1)^{Sm} \times S_k[\hat{F}(u)], \quad (64b)$$

and $$\hat{F}(u) = amod(amod((u+1)q, 2N), N) \quad (64c)$$

$$Sm = \begin{cases} 0, & \text{if } amod((u+1)q, 2N) \leq N \\ 1, & \text{if } amod((u+1)q, 2N) > N \end{cases}.$$

Then, equation (64a) can be rearranged as follows:

$$X_{DST}[k] = \sum_{\hat{u}=0}^{R-1} S_k[\hat{u}] \cdot \sin((\hat{u}+1)\hat{\theta}), \quad (65)$$

where $$\hat{\theta} = q \times \frac{\pi}{N}.$$

Then, the variable û in equation (65) is replaced with $$\hat{u} = \frac{(N-1)}{2} - 1 - \hat{u}$$

and the addition formula of trigonometric function is applied to sine function, so as to have:

$$X_{DST}[k] = \sum_{\hat{u}=0}^{R-1} S_k\left[\frac{(N-1)}{2} - 1 - \hat{u}\right] \cdot \quad (66)$$

$$\left(\cos\left(\frac{N}{2}\hat{\theta}\right) \cdot \cos\left(\left(\hat{u} + \frac{1}{2}\right)\hat{\theta}\right) + \sin\left(\frac{N}{2}\hat{\theta}\right) \cdot \sin\left(\left(\hat{u} + \frac{1}{2}\right)\hat{\theta}\right)\right).$$

Equation (66) may generate different mathematic models due to q factor being an odd number of an even number. The following derivation is based on equation (66) for q of $X_{DCT}$ being an odd number and an even number, respectively.

When q factor is an odd number, equation (66) is rewritten and a recursive formula is derived as follows:

$$X_{DST}[k] = (-1)^{\frac{q-1}{2}} \times \sum_{\hat{u}=0}^{i} S_k[i-\hat{u}] \cdot \cos\left(\hat{u} + \frac{1}{2}\right)\hat{\theta} \quad (67)$$

$$= (-1)^{\frac{q-1}{2}} \times$$

$$\left(S_k[i] \cdot \cos\frac{\hat{\theta}}{2} + \sum_{\hat{u}=0}^{i-1} S_k[i-1-\hat{u}] \cdot \cos\left(\hat{u} + \frac{3}{2}\right)\hat{\theta}\right)$$

$$= (-1)^{\frac{q-1}{2}} \times C_i(k),$$

where $$C_i(k) = S_k[i] \cdot \cos\frac{\hat{\theta}}{2} + \sum_{\hat{u}=0}^{i-1} S_k[i-1-\hat{u}] \cdot \cos\left(\hat{u} + \frac{3}{2}\right)\hat{\theta}, \quad (68)$$

$$i = \frac{(N-1)}{2} - 1.$$

Then, by applying Chebyshev polynomials in equation (34a) into $$\cos\left(\hat{u}+\frac{3}{2}\right)\hat{\theta}$$

of equation (68), the recursive computation formula $C_j(k)$ of DCT part is expanded, when q factor is an odd number, as follows:

$$C_j(k) = \cos\frac{\hat{\theta}}{2}(S_k[i]+S_k[i-1]) + 2\cos\hat{\theta}\cdot C_{i-1}(k) - C_{i-2}(k). \quad (69)$$

After performing z-transform on equation (69), we have:

$$H(z) = \frac{C_j(k,z)}{S_k(z)} = \frac{\cos\frac{\hat{\theta}}{2}(1-z^{-1})}{1-2\cos\hat{\theta}z^{-1}+z^{-2}}. \quad (70)$$

Figure 15:
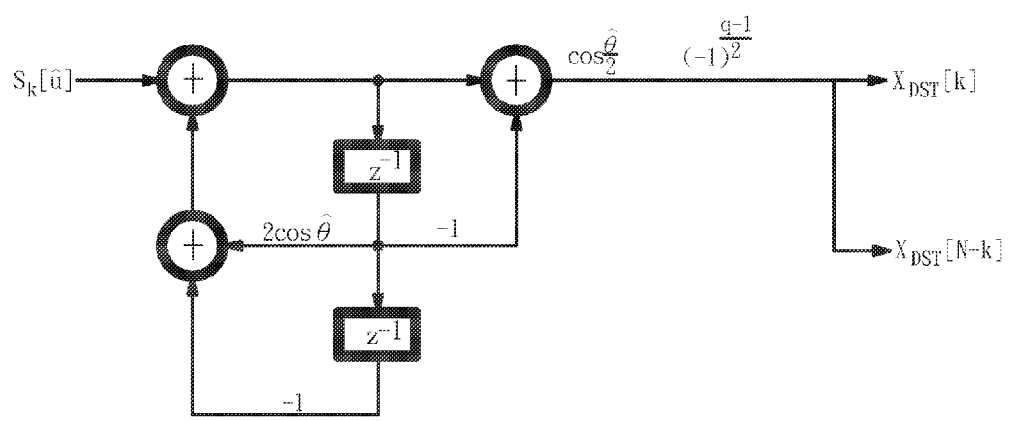
FIG. 15 schematically illustrates the DST architecture of fixed-coefficient prime length RDFT when q is an odd number.

By comparing equation (39) with equation (70), it is known that the recursive architecture is not changed when q factor is an even number. However, when q factor is an odd number, it has to be multiplied with $$(-1)^{\frac{q-1}{2}}$$

after completing recursive operation for determining the positive or negative sign, as shown in FIG. 15. FIG. 15 schematically illustrates the DST architecture of fixed-coefficient prime length RDFT when q is an odd number.

When q factor is an even number, equation (66) is rewritten and a recursive formula is derived as follows:

$$X_{DST}[k] = (-1)^{\frac{q}{2}} \times \sum_{\hat{u}=0}^{j} S_k[j-\hat{u}] \cdot \sin\left(\hat{u}+\frac{1}{2}\right)\hat{\theta} \quad (71)$$

$$= (-1)^{\frac{q}{2}} \times$$

$$\left(S_k[j]\cdot\sin\frac{\hat{\theta}}{2} + \sum_{\hat{u}=0}^{j-1} S_k[j-1-\hat{u}]\cdot\sin\left(\hat{u}+\frac{3}{2}\right)\hat{\theta}\right)$$

$$= (-1)^{\frac{q}{2}} \times D_i(k),$$

where $$D_i(k) = S_k[i]\cdot\sin\frac{\hat{\theta}}{2} + \sum_{\hat{u}=0}^{j-1} S_k[j-1-\hat{u}]\cdot\sin\left(\hat{u}+\frac{3}{2}\right)\hat{\theta}, \quad (72)$$

$$j = \frac{(N-1)}{2} - 1.$$

Next, by applying Chebyshev polynomials in equation (34a) into $$\sin\left(\hat{u}+\frac{3}{2}\right)\hat{\theta}$$

of equation (721), the recursive computation formula $D_i(k)$ of DST part is expanded, when q factor is an even number, as follows:

$$D_i(k) = \sin\frac{\hat{\theta}}{2}(S_k[i]+S_k[i-1]) + 2\cos\hat{\theta}\cdot D_{i-1}(k) - D_{i-2}(k). \quad (73)$$

After performing z-transform on equation (73), we have:

$$H(z) = \frac{D_i(k,z)}{S_k(z)} = \frac{\sin\frac{\hat{\theta}}{2}(1+z^{-1})}{1-2\cos\hat{\theta}z^{-1}+z^{-2}}. \quad (74)$$

Figure 16:
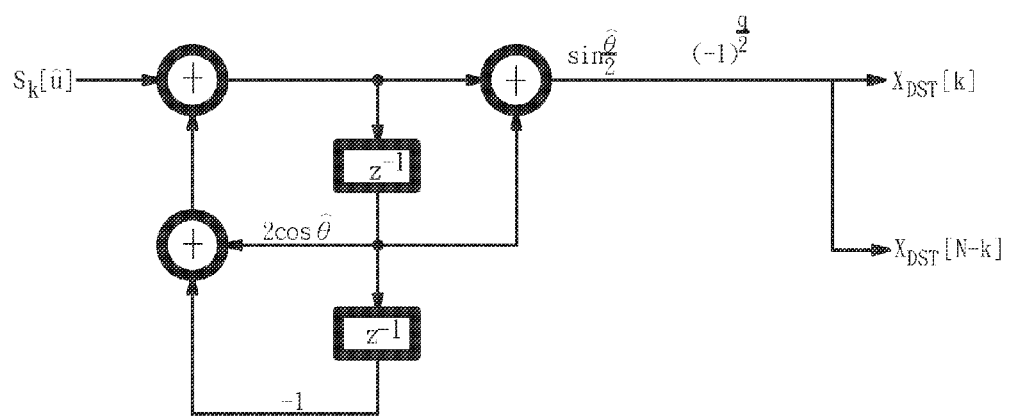
FIG. 16 schematically illustrates the DST architecture of fixed-coefficient prime length RDFT when q is an even number.

From observing equation (74), it is known that, when q factor is an even number, the recursive architecture is almost the same as that of DCT in equation (36) without q. The only difference is that positive/negative sign of $$(-1)^{\frac{q}{2}}$$

has to be multiplied at the end of recursive operation, as shown in FIG. 16. FIG. 16 schematically illustrates the DST architecture of fixed-coefficient prime length RDFT when q is an even number.

In view of the above results, it can be found as follows:
When q is an odd number, we have $A_i(k)=D_i(k)$ and $$(-1)^{\frac{q}{2}}$$

has to be multiplied outside the recursive formula.
When q is an even number, we have $B_i(k)=C_i(k)$ and $$(-1)^{\frac{q-s}{2}}$$

has to be multiplied outside the recursive formula.

In addition, because $A_i(k)$ and $B_i(k)$ are recursive formulas of $X_{DCT}[k]$, they have to be added with x[0] finally.

Figure 17:
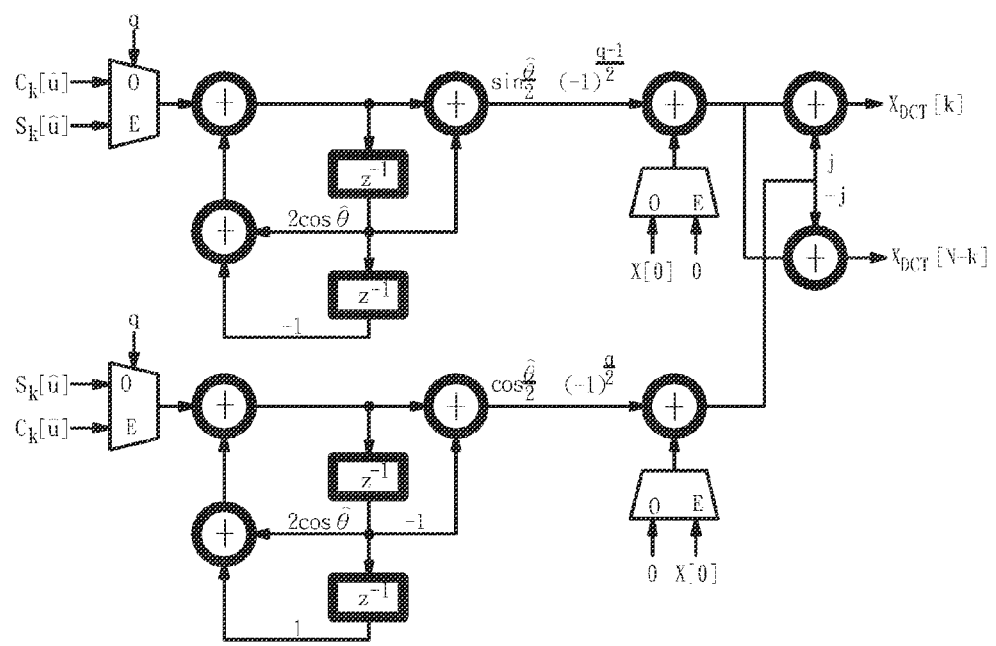
FIG. 17 schematically illustrates the architecture of fixed-coefficient prime length RDFT when q factor is added in the present invention.

As a result, FIGS. 13, 14, 15 and 16 can be integrated into that shown in FIG. 17. FIG. 17 schematically illustrates the architecture of fixed-coefficient prime length RDFT when q factor is added in the present invention.

In FIG. 17, at the front end, multiplexers are selected by q being an odd number or an even number so as to switch the input signals. In computing DCT, the multiplexers at the back end select the input of x[0].

By comparing FIG. 17 with FIG. 8, the coefficient angle in the fixed-coefficient prime length RDFT circuit architecture is changed from $$\theta = \frac{\pi}{N} \text{ to } \hat{\theta} = q \times \frac{\pi}{N}.$$

In addition to additionally determining whether q factor is an odd number or an even number and having the multiplexers for the input of x[0], the overall architecture is substantially kept the same. However, the circuit architecture of FIG. 17 is allowed to have an increased precision due to that the position of pole point is adjusted by q factor.

The aforementioned description fully describes the derivation and architecture for the fixed-coefficient prime length RDFT method, and also proposes q factor to alleviate the drawback of low precision for the fixed-coefficient architecture.

In the previous description, only coefficient $2\cos\hat{\theta}$ is discussed, but not coefficient $$\sin\frac{\hat{\theta}}{2}$$

and coefficient $$\cos\frac{\hat{\theta}}{2}.$$

Figure 18:
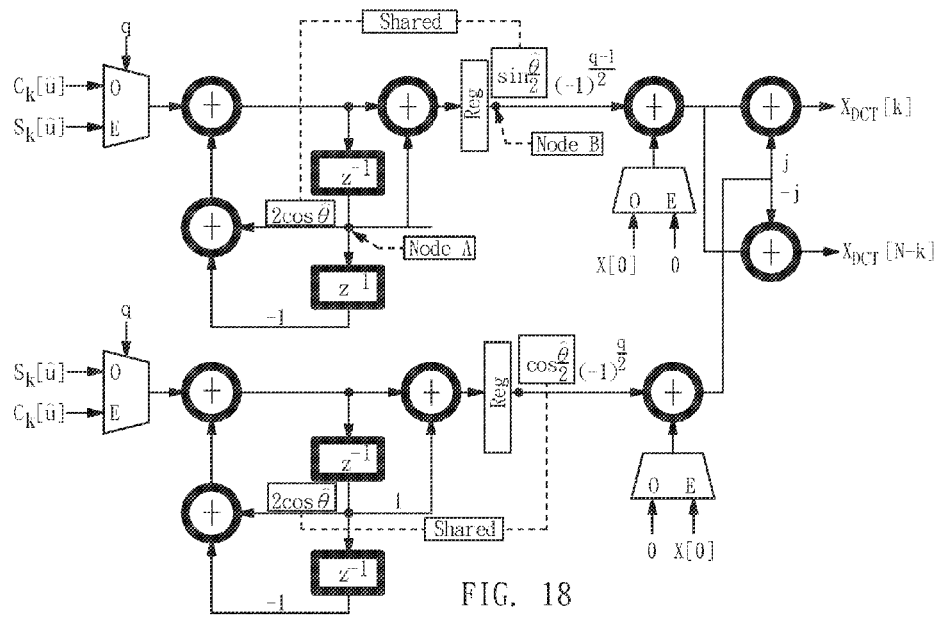
FIG. 18 schematically illustrates an RDFT architecture in which multiplexers are shared.

FIG. 18 schematically illustrates an RDFT architecture in which multiplexers are shared. From FIG. 18, it is known that the fixed-coefficient prime length RDFT architecture requires 8 real-number multiplexers for computing these coefficients. However, after observation, it is found that coefficient $$\sin\frac{\hat{\theta}}{2}$$

or coefficient $$\cos\frac{\hat{\theta}}{2}$$

will use multipliers for computation only when coefficient $2\cos\hat{\theta}$ of the recursive part complete multiplying operation. If two multipliers are actually used to compute coefficient $2\cos\hat{\theta}$ and coefficients $$\sin\frac{\hat{\theta}}{2}, \cos\frac{\hat{\theta}}{2}$$

in hardware implementation, not only the efficiency is poor but also the circuit area and the power consumption are wasted in terms of the multiplier of the latter one. From table 3, it is known that the number of transistors in register and multiplexer is much smaller than that in multiplier. Therefore, register and multiplexer are used to achieve common use of multiplier for coefficient $2\cos\hat{\theta}$ and coefficients $$\sin\frac{\hat{\theta}}{2}, \cos\frac{\hat{\theta}}{2}.$$

The extra cost is to pay an additional cycle for executing the multiplication operation for coefficients $$\sin\frac{\hat{\theta}}{2}, \cos\frac{\hat{\theta}}{2}.$$

Figure 19:
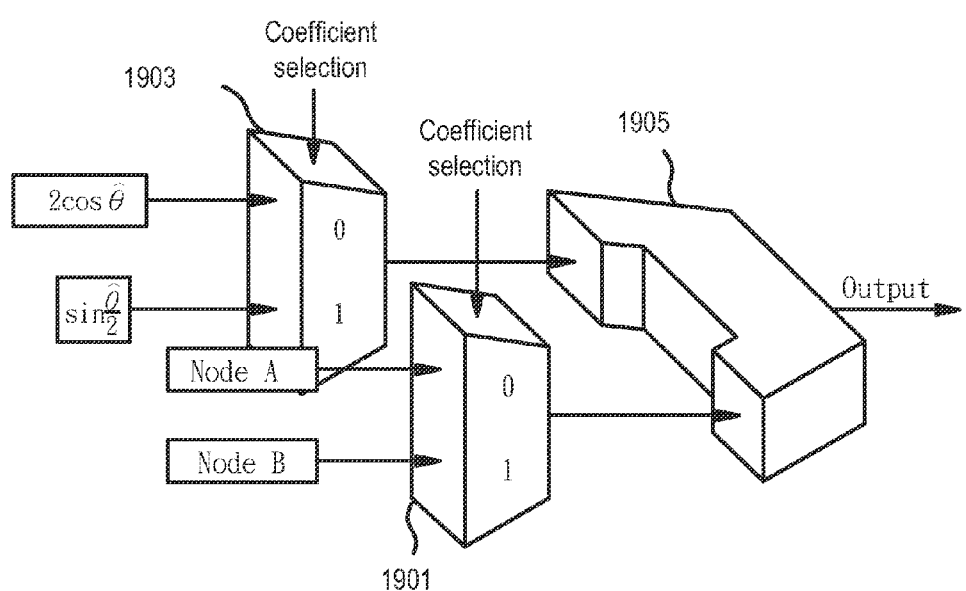
FIG. 19 schematically illustrates the implementation of common use of multiplier.

Because this architecture is provided with the advantage of shortest computation cycle, the cost of paying a small amount of computation cycle is acceptable. FIG. 18 shows the disposed positions of the registers in common use of multiplier, and FIG. 19 schematically illustrates the implementation of common use of multiplier.

TABLE 3

| | Number of transistors in 24-bit device | | | |
|---|---|---|---|---|
| Device | Latch | Adder | Multiplier | Multiplexer |
| Number of transistors | 240 | 672 | 18624 | 192 |

With such an improvement, the number of real-number multipliers is reduced from 8, as shown in 17, to only 4, as shown in 18, and 100% of efficiency for multiplier can be achieved, so as to have a significant improvement in area and power consumption.

After this design of common use of multiplier, there are 4 multiplexers and 2 registers required for the common use of multiplexer in the DCT and DST architectures for real-number computation. For complex-number input, another set of identical hardware is required to execute complex-number computation, and thus an extra cost is to pay additional 8 multiplexers and 4 registers. From table 3, it is known that the number of transistors in multiplier is much larger than that in register and multiplexer. In this design, 8 multiplexers and 4 registers are added to save 4 multipliers, and finally only one additional computation cycle is required. Because the architecture has the shortest computation cycle and the additional computation cycle does not influence the advantage, this design is accordingly feasible.

Figure 20:
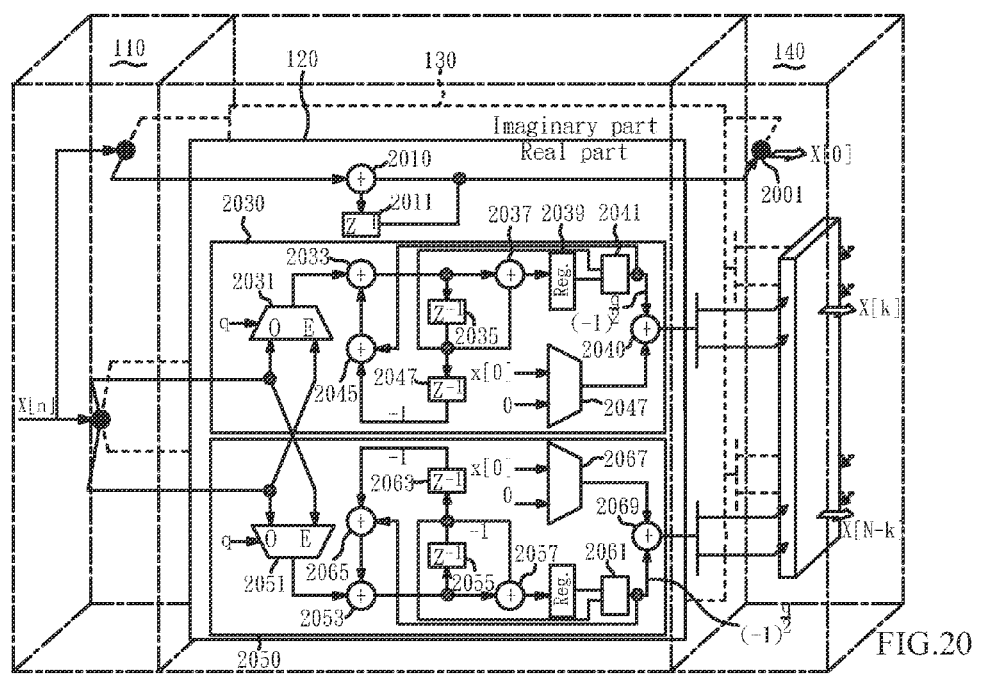
FIG. 20 is a block diagram of the fixed-coefficient variable prime length recursive discrete Fourier transform system in accordance with an embodiment of the present invention.

From the aforementioned description, the overall architecture of the present invention can be depicted as shown in FIG. 20, FIG. 20 is a block diagram of the fixed-coefficient variable prime length recursive discrete Fourier transform system 100 in accordance with an embodiment of the present invention. The fixed-coefficient variable prime length recursive discrete Fourier transform system 100 includes a pre-processing device 110, a real-part computation device 120, an imaginary-part computation device 130, and a post-processing device 140. For the two circles in the pre-processing device 110, the upper circle represents that the pre-processing splits the original complex-number signal x[n] into real-part input and imaginary-part input, and the lower circle represents that, in addition to splitting x[n] into real-part and imaginary-part inputs, the pre-processing further permutes $c_k[\hat{u}]$ and $s_k[\hat{u}]$ according to the aforementioned equations.

The real-part computation device 120 and the imaginary-part computation device 130 are respectively a simple accumulator for independently computing X[0] and a DCT and DST processing kernel fix computing X[1] to X[N−1]. Because DCT and DST of the real-part computation device 120 and the imaginary-part computation device 130 produce two points for one time and computation result of imaginary-part kernel hardware is provided, the post-processing device 140 will alternately add them for being combined as a complex-number output result. The post-processing (2001) of X[0] is simply to combine the real-part and imaginary-part results for forming a complex number.

From the aforementioned description and FIG. 20, it is known that the real-part computation device 120 and the imaginary-part computation device 130 have the same hardware architecture.

The real-part computation device 120 includes a first adder 2010 and a first delay device 2011. The imaginary-part computation device 130 includes a first adder and a first delay device (not shown). The first adder 2010 and the first delay device 2011 of the real-part computation device 120 and the first adder and the first delay device of the imaginary-part computation device 120 are employed to compute the first output signal (X[0]) of the N output signals (X[k]).

The real-part computation device 120 includes a first recursive discrete cosine/sine computation device 2030 and a second recursive discrete cosine/sine computation device 2050.

When q factor is an odd number, the first recursive discrete cosine/sine computation device 2030 performs a recursive discrete cosine transform (DCT) operation onto the real-part of the first temporal signal ($c_k[\hat{\mu}]$). When q factor is an even number, the first recursive discrete cosine/sine computation device 2030 performs a recursive discrete sine transform (DCT) operation onto the real-part of the second temporal signal ($s_k[\hat{\mu}]$).

When q factor is an odd number, the second recursive discrete cosine/sine computation device 2050 performs a recursive discrete sine transform (DST) operation onto the real-part of the second temporal signal ($s_k[\hat{\mu}]$), When q factor is an even number, the second recursive discrete cosine/sine computation device 2050 performs a recursive discrete cosine transform (DCT) operation onto the real-part of the first temporal signal ($c_k[\hat{\mu}]$).

The first recursive discrete cosine/sine computation device 2030 includes: a first multiplexer 2031, a second adder 2033, a second delay device 2035, a third adder 2037, a first register 2039, a first shared multiplication device 2041, a third delay device 2043, a fourth adder 2045, a second multiplexer 2047 and a fifth adder 2049.

The first multiplexer 2031 is connected to the pre-processing device 110 for receiving the real part of the first temporal signal ($c_k[\hat{\mu}]$) and the real part of the second temporal signal ($s_k[\hat{\mu}]$), and generating a first multiplexing signal.

The second adder 2033 is connected to the first multiplexer 2031 for performing an addition operation to the first multiplexing signal and a fourth addition signal, so as to generate a second addition signal.

The second delay device 2035 is connected to the second adder 2033 for performing a delay operation to the second addition signal, so as to generate a second delay signal.

The third adder 2037 is connected to the second adder 2033 and the second delay device 2035 for performing an addition operation to the second addition signal and the second delay signal, so as to generate a third addition signal.

The first register 2039 is connected to the third adder 2037 for temporarily storing the third addition signal, so as to generate a first buffering signal.

The first shared multiplication device 2041 is connected to the first register 2039 and the second delay device 2035 for performing a multiplication operation to the second delay signal or the first buffering signal, so as to generate a first multiplication signal.

The third delay device 2043 is connected to the second delay device 2035 for performing a delay operation to the second delay signal, so as to generate a third delay signal.

The fourth adder 2045 is connected to the first shared multiplication device 2041 and the third delay device 2043 for generating the fourth addition signal.

The second multiplexer 2047 receives the first input digital signal (x[0]) of the N digital signals (x[n]) and a constant, and generates a second multiplexing signal based on the q factor.

The fifth adder 2049 is connected to the first shared multiplication device 2041 and the second multiplexer 2047 for performing an addition operation to the first multiplication signal and the second multiplexing signal, so as to generate the fifth addition operation.

When q factor is an odd number, the first multiplexer 2031 outputs the real part of the first temporal signal ($c_k[\hat{\mu}]$) so as to generate the first multiplexing signal, and the second multiplexer 2047 outputs the first input digital signal (x[0]) so as to generate the second multiplexing signal. When q factor is an even number, the first multiplexer 2031 outputs the real part of the second temporal signal ($c_k[\hat{\mu}]$) so as to generate the first multiplexing signal, and the second multiplexer 2047 outputs the constant so as to generate the second multiplexing signal.

The second recursive discrete cosine/sine computation device 2050 includes: a third multiplexer 2051, a sixth adder 2053, a fourth delay device 2055, a seventh adder 2057, a second register 2059, a second shared multiplication device 2061, a fifth delay device 2063, an eighth adder 2065, a fourth multiplexer 2067 and a ninth adder 2069.

The third multiplexer 2051 is connected to the pre-processing device 110 for receiving the real part of the first temporal signal ($c_k[\hat{\mu}]$) and the real part of the second temporal signal ($s_k[\hat{\mu}]$), and generating a third multiplexing signal.

The sixth adder 2053 is connected to the third multiplexer 2051 for performing an addition operation to the third multiplexing signal and an eighth addition signal, so as to generate a sixth addition signal.

The fourth delay device 2055 is connected to the sixth adder 2053 for performing a delay operation to the sixth addition signal, so as to generate a fourth delay signal.

The seventh adder 2057 is connected to the sixth adder 2053 and the fourth delay device 2055 for performing an addition operation to the sixth addition signal and the fourth delay signal, so as to generate a seventh addition signal.

The second register 2059 is connected to the seventh adder 2057 for temporarily storing the seventh addition signal, so as to generate a second buffering signal.

The second shared multiplication device 2061 is connected to the second register 2059 and the fourth delay device 2055 for performing a multiplication operation to the fourth delay signal or the second buffering signal, so as to generate a second multiplication signal.

The fifth delay device 2063 is connected to the fourth delay device 2055 for performing a delay operation to the fourth delay signal, so as to generate a fifth delay signal.

The eighth adder 2065 is connected to the second shared multiplication device 2061 and the fifth delay device 2063 for generating the eighth addition signal.

The fourth multiplexer 2067 receives the first input digital sign (x[0]) of the N digital signals (x[n]) and a constant, and generates a fourth multiplexing signal based on the q factor.

The ninth adder 2069 is connected to the second shared multiplication device 2061 and the fourth multiplexer 2067 for performing an addition operation to the second multiplication signal and the fourth multiplexing signal, so as to generate the ninth addition signal.

When q factor is an odd number, the third multiplexer 2051 outputs the real part of the second temporal signal ($s_k[\hat{\mu}]$) so as to generate the third multiplexing signal, and the fourth multiplexer 2067 outputs the constant so as to generate the fourth multiplexing signal. When q factor is an even number, the third multiplexer 2051 outputs the real part of the first temporal signal ($c_k[\hat{\mu}]$) so as to generate the third multiplexing signal, and the fourth multiplexer 2067 outputs the first input digital signal (x[0]) so as to generate the fourth multiplexing signal.

With reference to FIG. 19, there is shown a circuit diagram of the shared multiplication device in accordance with the present invention. The first shared multiplication device 2041 and the second shared multiplication device 2061 have the sane hardware architecture.

The first shared multiplication device 2041 includes a fifth multiplexer 1901, a sixth multiplexer 1903 and a multiplier 1905.

The fifth multiplexer 1901 has a first input terminal (node A) connected to the second delay device and a second input terminal (node B) connected to the first register for selecting the second delay signal or the first buffering signal, so as to generate a fifth multiplexing signal.

The sixth multiplexer 1903 has a first input terminal for receiving a cosine coefficient $(2\cos(\hat{\theta}))$ and a second input terminal for receiving a sine coefficient $$\left(\sin\left(\frac{\hat{\theta}}{2}\right)\right),$$

so as to generate a sixth multiplexing signal.

The multiplier is connected to the fifth multiplexer 1901 and the sixth multiplexer 1903 for performing a sine coefficient multiplication operation or a cosine coefficient multiplication operation to the fifth multiplexing signal.

With reference to FIG. 20, by taking the real-part computation device 120 as an example, the hardware computation data flowchart is depicted, after reset, as follows:

1. At beginning, DCI transform of k=0 is computed by a simple accumulation circuit. Based on equation (2), an input x[n] is accumulated in each computation cycle. When N computation cycles are spent to complete N times of accumulation, the result of X[0] is outputted.

2. At the time of reset, the processing kernel circuit of DCT and DST starts to compute DFT transform for k=1. At the beginning of the first computation cycle, $C_1[0]$ and $S_1[0]$ are inputted at the same time.

3. When determining that q factor is an odd number, the multiplexer allows $C_1[0]$ and $S_1[0]$ to be respectively inputted into DCT and DST recursive architecture for computation. When q factor is an even number, $C_1[0]$ and $S_1[0]$ are allowed to be respectively inputted into DST and DCT recursive architecture for computation. As a result, signal exchange operation can be achieved.

4. $C_1[0]$ and $S_1[0]$ are inputted into the architecture to start a recursive operation, and the total number of recursive computation cycles is (N−1)/2. In each recursive operation, it is multiplied with fixed coefficient $2\cos\hat{\theta}$.

5. At the end of (N−1)/2 time of recursion, the values in two registers are added with each other (or subtracted from each other in DST architecture) and the resultant value is stored in a next-stage register, while the multiplier stops operation at this moment.

6. From the design of the shared multiplication devices 2041, 2061, it is known that an extra computation cycle is required in order to share the multiplier with the coefficient $2\cos\hat{\theta}$ in step (4), so as to take out the value in register for being multiplied with $$\sin\frac{\hat{\theta}}{2}\left(\text{or }\cos\frac{\hat{\theta}}{2}\text{ in DST architecture}\right),$$

and then positive negative sign adjustment is performed by $$(-1)^{\frac{q-1}{2}}\left(\text{or }(-1)^{\frac{q}{2}}\text{ in DST architecture}\right).$$

7. From equation (52b), it is known that the computation of $X_{DCT}[k]$ requires an addition with x[0] at the end of computation. At this moment, if determining an architecture for DCT computation, the multiplexer allows addition of x[0] and result; otherwise, the architecture is for DST computation and 0 is added therewith.

8. Based on equations (3) and (5) the result of step (7) can directly output two points $X_{DCT}[k]$, $X_{DCT}[N-k]$ and $X_{DST}[k]$, $X_{DST}[N-k]$ for one time in a wired manner, and the result is sent to the post-processing hardware part for performing signal addition.

Figure 21:
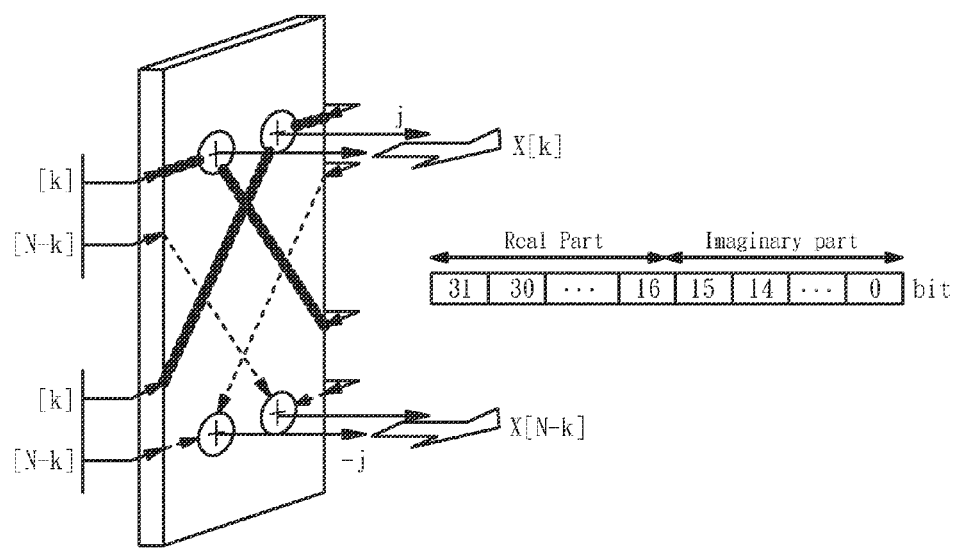
FIG. 21 is a schematic diagram showing the operation of the post-processing device in accordance with the present invention.

9. The post processing is illustrated in FIG. 21. FIG. 21 is a schematic diagram showing the operation of the post-processing device in accordance with the present invention, in which the [k] point result of the real-part architecture and the [k] point result of the imaginary-part architecture are added together (bold dot line), and the [N−k] point result of the real-part architecture and the [N−k] point result of the imaginary-part architecture are added together (dot line). In order to resume a set of complex number result, the real-part and imaginary-part value of each point, a set of 32 bits is used to represent a point of complex number result, wherein the former 16 bits (0-15) are the imaginary-part result, and the latter 16 bits are the real-part result, so as to obtain the value for points X[1] and X[N−1]. The total number of computation cycles for computing two points is (N−1)/2+1.

10. Then, the process continues by using steps (2) to (9) to compute X[2], so as to obtain the result of points X[2], X[N−2]. The process is repeated until completing the computation of $$X\left[\frac{N-1}{2}\right]$$

and its symmetric point $$X\left[\frac{N+1}{2}\right].$$

The number of computation cycles for computing N points $$\frac{(N-1)}{2}\times\left(\frac{(N-1)}{2}+1\right).$$

In the prior art, Yang & Chen is a prior fixed-coefficient algorithm and Curtis & Wickenden is a prior RDFT method using prime number length. Because the design of the present invention only supports prime number length, the following comparison data is based on data point N=37/41/53/67/113 applied in the present invention, so as to prove that the proposed method and hardware architecture have better efficiency in prime number length. In the aspect of data, analysis and comparison are performed on various data such as computation cycles, coefficient ROM requirement, hardware cost requirement, computation complexity and precision.

RDFT computation cycle requirement evaluation and comparison:

If the number of points for DFT transform specification is N and the algorithm proposed by Goertzel is used to proceed with transformation, the number of computation cycles required is N×(N+1). If the algorithm proposed by Curtis is used to proceed with transformation, the number of computation cycles required is $N^2$ in the premise of completing data input. If the algorithm proposed by Yang et al. is used to proceed with transformation, the number of computation cycles required is $N^2$. If the algorithm proposed by Lai et al. is used to proceed with transformation, the number of computation cycles required is (N−1)(N+1)/2. For the architecture proposed by the present invention, the computation cycle requirement is illustrated as by equation (75):

$$\frac{(N-1)}{2} \times \left(\frac{(N-1)}{2} + 1\right). \tag{75}$$

As for comparison data, a comparison is performed by using the number of points N=37/41/53/67/113 specified in the present invention, and the comparison result is shown in table 6.1.1.

TABLE 6.1.1

Computation cycle compared with prior art

| | | Method | | | | |
|---|---|---|---|---|---|---|
| | | Goertzel | Curtis | Yang | Lai | Present invention |
| | | N(N + 1) | N2 | N2 | (A) | (B) |
| Frame Size | 37 | 1406 | 1369 | 1369 | 684 | 342 |
| | 41 | 1722 | 1681 | 1681 | 840 | 420 |
| | 53 | 2862 | 2809 | 2809 | 1404 | 702 |
| | 67 | 4556 | 4489 | 4489 | 2244 | 1122 |
| | 113 | 12882 | 12769 | 12769 | 6384 | 3192 |

(A) (N − 1)(N + 1)/2
(B) (N − 1)(N + 1)/4

TABLE 6.1.2

Improved multiple for computation cycle of prior art

| | | Method | | | | |
|---|---|---|---|---|---|---|
| | | Goertzel | Curtis | Yang | Lai | Present invention |
| Frame Size | 37 | 4.11 | 4.00 | 4.00 | 2.00 | 1 |
| | 41 | 4.10 | 4.00 | 4.00 | 2.00 | 1 |
| | 53 | 4.08 | 4.00 | 4.00 | 2.00 | 1 |
| | 67 | 4.06 | 4.00 | 4.00 | 2.00 | 1 |
| | 113 | 4.04 | 4.00 | 4.00 | 2.00 | 1 |

From the result of Table 6.1.1, the improvement in cycles can be further determined, as shown in Table 6.1.2. From table 6.1.2, it can be found that, in DFT computation of prime number length, the overall efficiency of the architecture proposed by the present invention has more than 50.00% of improved multiple in comparison with the prior art.

Required Amount of Coefficients and Comparison

The required amount of coefficients to be memorized in the architecture of each method will be compared and described. In general, the memory device ROM built in a chip is used to store the pre-computed coefficients. Then, LTU (Look-up Table) is employed to provide the required coefficients enquired in the architecture during transformation. The memory device has a significant influence to the implemented area of a chip. Therefore, the required amount of coefficients plays an important role in the hardware efficiency indexes.

The amount of coefficients required in hardware architecture can be estimated by the transfer function and architecture diagram finally presented by the method. By summing the cosine coefficient and sine coefficient used in the transfer function or architecture and multiplying it with the range of external point number index k, the amount of coefficients required can be estimated. Taking the Goertzei method as an example, it requires N points for index value k of 0~N−1, and two kinds of coefficient $$\cos\left(\frac{2\pi k}{N}\right), \sin\left(\frac{2\pi k}{N}\right)$$

are used in the architecture. Therefore, the amount of coefficients required is N×2=2N. For Lai et al., when N is an odd number, X[0] has to be computed additionally. When N is an even number, X[N/2] has to be computed additionally. Further, because there are two points outputted for one time, the external point number k is (N−1)/2, and there are two kinds of coefficient, cosine and sine, used in the architecture, so that the amount of coefficients required is 2×((N−1)/2)=N−1. For the remaining prior art such as Yang and Curtis, the evaluation is similar and thus a detailed description is deemed unnecessary.

Table 6.1.3 lists the general form of the amount of coefficients required for each prior art so as to facilitate a comparison. Although the amount of coefficients required for the prior art of Curtis is 0, the remaining two variables have to be redesigned to satisfy the required coefficient value for its coefficients due to different N. The architecture proposed by the present invention is provided with fixed-coefficient capability and thus there is no requirement to store any coefficient value. The result is shown in Table 6.2.1.

TABLE 6.2.1

Comparison with amount of coefficients required in other prior arts and improved percentage

| Method | Goertzel | Curtis | Yang | Lai | Present invention |
|---|---|---|---|---|---|
| Pre-processing | 0 | 0 | N | 0 | 0 |
| Kernel | 2N | 0 | 0 | N − 1 | 0 |
| Total ROM | 2N | 0 | N | N − 1 | 0 |
| Improved | 100% | 0% | 100% | 100% | — |

From the comparison result of Table 6.2.1, it is known that the fixed-coefficient architecture proposed by the present invention does not have any requirement for the amount of coefficients required, which means that such architecture is able to save the area requirement of coefficient ROM in chip implementation, thereby achieving the purpose of reducing the cost.

RDFT Hardware Requirement and Computation Complexity Analysis:

In addition to that the memory device ROM may influence the chip area, the architecture hardware is also one of the factors to be considered. An evaluation for the number of multipliers and adders will be made to the prior arts of Goertzel, Curtis, Yang and Lai, and the hardware architecture proposed by the present invention. Based on the evaluation result, various methods are employed to derive the computation complexities.

Because the complexity is obtained based on hardware evaluation, it is required to first compute the resource required by the hardware. The architecture of Goertzel method includes 8 real-number adders and 6 real-number multipliers. The hardware requirement for the architecture of Curtis method includes 6 real-number adders and 6 real-number multipliers under the condition of having the 0-th point without containing the pre-processing. The hardware requirement for the architecture of Yang et al. method includes 12 real-number adders and 6 real-number multipliers under the condition of containing no pre-processing. The hardware requirement for the architecture of Lai et al. method includes 13 real-number adders and 2 real-number multipliers.

For the architecture proposed by the present invention, from FIG. 20 and FIG. 21, it is known that the architecture is realized by splitting DFT into DCT and DST, and thus it requires 21 real-number adders. Therefore, the improvement in common use of multiplier requires only 4 real-number multipliers. The complete hardware evaluation result is shown in Table 6.3.1, which lists not only the number of multipliers and adders but also the amount of coefficients required from the previous comparison and the Data Throughput per Transformation (DTPT) of each algorithm.

TABLE 6.3.1

RDFT algorithm hardware resource comparison for various prior arts

| Method | Goertzel | Curtis | Yang | Lai | Present invention |
|---|---|---|---|---|---|
| Adder | 8 | 6 | 12 | 13 | 21 |
| Multiplier | 6 | 6 | 6 | 2 | 4 |
| Coefficient ROM | 2N | 0 | N | N − 1 | 0 |
| DTPT | 1 | 1 | 1 | 2 | 2 |

From the comparison result of table 6.3.1, it is known that, although the number of adders required in the architecture proposed by the present invention is larger than that required in prior arts, the number of multipliers is much smaller than Goertzei, Yang and Curtis due to the common use of multiplier. Further, there is no need to spend any memory to store coefficients and only half number of points is computed, so that DTPT can achieve double efficiency.

With the result of Table 6.3.1, the number of hardware can be used to compute the hardware complexity. The basic evaluation method is the number of computation cycles required by the recursive kernel multiplied with the number of hardware required, further multiplied with the number of points required for computation, and finally multiplied with 2 due to that the complex number computation requires one real-part architecture and one imaginary-part architecture, wherein, because not all values are recursive for the same number in the architecture, the parts of different number of recursions have to be computed independently and then added together. The basic Goertzel will be taken as an example to describe the detailed computation architecture and computation complexity. For other prior arts, similar manner can be referenced for evaluation or the evaluation result of the prior can be directly referenced. Finally, the computation complexity of the inventive architecture is introduced. The evaluation result is shown in Table 6.3.2 and Table 6.3.3.

Taking Goertzel method as an example, the computation complexity for addition is first determined. Because the number of computation cycles for the major recursive kernel is N+1, the computation for the 2 adders at left-hand side requires recursive N+1 computation cycles, and thus the sub- total number is 2(N+1). After recurring for N+1 times at left-hand side, the adder at right-hand side actually takes its value for performing an addition and thus the computation amount of the right-hand side adder is 1 time. Expansion of coefficient $W_N^k$ actually includes 1 addition. The subtotal of number of computation cycles is now 2(N+1)+2, which is the computation amount of addition required for performing one point of RDFT computation. Because there are N points in total, the number of computation cycles is N×(2(N+1)+2). Further, because the signal is a complex number, an extra set of computation amount is required, and thus the final computation amount of addition is 2N×(2(N+1)+2).

Similar manner is employed to determine the computation amount of multiplication. A coefficient $2 \cos \theta_k$ exists at left-hand side, which requires 1 multiplication. After performing N+1 recursive cycles, the subtotal number is N+1. The $W_N^k$ at right hand-side includes two coefficients $\cos \theta_k$ and $\sin \theta_k$, which require two times of multiplication, and thus the subtotal of cycles is (N+1)+2.

Because there are N points in total, the number of computation cycles is N×((N+1)+2). Further, because the signal is a complex number, an extra set of computation amount is required, and thus the final computation amount of multiplication, is 2N×((N+1)+2).

With reference to FIG. 20, the computation complexity of addition and the computation complexity of multiplication for the RDFT architecture proposed by the present invention are as follows:

Computation Amount of Addition:

1. The simple accumulator for computing X[0] has one adder and recurs for N times. The addition computation amount, including complex number operation, is 2N.

2. In DCT architecture, there are 2 adders existed at left-hand side for recurring (N−1)/2 times, and subtotal of computation amount is N−1. There are 2 adders existed at right-hand side, and subtotal of computation amount is (N−1)+2. Because there are (N−1)/2 points to be computed in total, the subtotal of computation amount is $$\frac{N-1}{2} \times ((N-1)+2).$$

After involving the complex number computation, the computation amount of addition is N−1×((N−1)+2).

3. The hardware resource required by DST architecture is the same as that required by DCT. Therefore, the computation amount of addition thereof is the same as that of DCT, which is N−1×((N−1)+2).

4. In FIG. 21, there are 4 adders existed in the post-processing and (N−1)/2 points in total have to be computed, so that the computation amount of addition is 2(N−1).

5. After summing the computation amounts of addition in steps (1) to (4), the computation amount of addition for the overall architecture is 2N(N+2).

Computation Amount of Multiplication:

1. In DCI architecture, there is 1 coefficient $2 \cos \hat{\theta}$ existed at left-hand side so that a multiplication is required for recurring (N−1)/2 times and subtotal of computation amount is (N−1)/2. There is 1 adder existed at right-hand side, and subtotal of computation amount is (N−1)/2+1. Because there are (N−1)/2 points to be computed in total, the subtotal of computation amount is $$\frac{N-1}{2} \times \left(\frac{N-1}{2} + 1\right).$$

After involving the complex number computation, the computation amount of addition is $$N - 1 \times \left(\frac{N-1}{2} + 1\right).$$

2. The hardware resource required by DST architecture is the same as that required by DCT. Therefore, the computation amount of multiplication thereof is the same as that of DCT, which is $$N - 1 \times \left(\frac{N-1}{2} + 1\right).$$

3. After summing the computation amounts of multiplication in steps (1) to (4), the computation amount of multiplication for the overall architecture is (N−1)(N+1).

TABLE 6.3.2

Computation complexity analysis for proposed RDFT architecture

| Operation | N | Frame Size, N | | | | |
|---|---|---|---|---|---|---|
| | | 37 | 41 | 53 | 67 | 113 |
| Real Addition | 2N(N + 2) | 2886 | 3526 | 5830 | 9246 | 25990 |
| Real Multiplication | (N − 1)(N + 1) | 1368 | 1680 | 2808 | 4488 | 12768 |

TABLE 6.3.3

Computation complexity analysis for various RDFT methods (N = 113)

| Method | Real Addition | | Real Multiplication | |
|---|---|---|---|---|
| Goertzel | N(4N + 8) | 51980 | N(2N + 6) | 26216 |
| Curtis | 2N(2N + 1) | 51302 | 2N(N + 2) | 25990 |
| Yang | 2N(2N + 3) | 51754 | 2N(N + 2) | 25990 |
| Lai | N(4N + 14) − 4 | 52654 | (N − 2)(N + 1) | 12654 |
| Present invention | 2N(N + 2) | 25990 | (N − 1)(N + 1) | 12768 |

TABLE 6.3.4

Improved percentage of computation complexity for various prior arts (N = 113)

| Method | Real Addition | Real Multiplication |
|---|---|---|
| Goertzel | 50.00% | 51.30% |
| Curtis | 49.34% | 50.87% |
| Yang | 49.78% | 50.87% |
| Lai | 50.64% | −0.90% |
| Present invention | — | — |

From Table 6.3.4, it is known that the addition complexity of the RDFT architecture proposed by the present invention has improved percentage of more than 49.34% in comparison with other prior arts. For the multiplication complexity, in addition to being slightly higher that that of Lai, it has improved percentage of more than 50.87% in comparison with other prior arts.

From Table 6.1.1, it is known that, if the hardware resource for Lai is doubled, the hardware cost will be slightly higher than the proposed architecture and the number of computation cycles will be reduced to be equivalent to that of the proposed architecture. However, for the computation complexity, the high computation amount of addition and multiplication is very serious. Therefore, under such a consideration, the proposed architecture is still superior.

PSNR, precision analysis and FPGA data:

In precision evaluation, Peak Signal to Noise Ratio (PSNR) is used to perform simulation and analysis. PSNR is an engineering term for the ratio between the maximum possible power of a signal and the power of corrupting noise that affects the fidelity of its representation. Because many signals have a very wide dynamic range, PSNR is usually expressed in terms of the logarithmic decibel scale. Because there must be an error existed between analog signal (ideal value) and digital signal processed by hardware (signal quantization), a precision analysis has to be made to ensure that the system can keep the advantage of high precision. PSNR is defined as shown in equation (76):

$$PSNR = 10 \cdot \log_{10}\left(\frac{MAX^2}{MSE}\right) \qquad (76)$$

$$= 20 \cdot \log_{10}\left(\frac{MAX}{\sqrt{MSE}}\right),$$

wherein $$MSE = \frac{1}{mn} \cdot \sum_{i=0}^{m-1}\sum_{j=0}^{n-1} \|I(i, j) - K(i, j)\|^2.$$

The symbols are defined as: I(i, j) represents ideal signal and K(i, j) represents actual signal.

The present invention makes use of q factor to effectively increase the precision. Based on hardware computation result, PSNR value can be promoted when an ideal q value ((N−1)/2) is selected. When the number of points N is getting larger, the improved pole point distance is getting larger and the improved range of PSNR value is thus increased. The analysis for 1000 sets of input random signals is shown in Table 6.3.5. In hardware design and planning, the coefficient and signal word-length are in the form of 16-bits and output word-length is of 32-bits (0 to 15-bits for imaginary part and 16 to 31-bits for real part).

TABLE 6.4.1

PSNR for different q values at each point

| | q Value | 1 | (N − 1)/2 |
|---|---|---|---|
| Frame Size | 37 | 77.2686 | 80.1379 |
| | 41 | 67.8692 | 78.5092 |
| | 53 | 58.8131 | 76.2207 |
| | 67 | 52.1570 | 75.9800 |
| | 113 | 41.4721 | 75.5928 |

TABLE 6.4.2

Prime Length Recursive DFT implemented in FPGA

| FPGA Device | Virtex4xc4vlx160 |
| --- | --- |
| Number of Slices | 750/67584 1% |
| Number of Slice Flip Flops | 436/135168 <1% |
| Number of 4 input LUTs: | 1396/135168 1% |
| Number of DSP48s: | 32/96 33% |
| Max. clock rate | 76.444 MHz |

From the aforementioned comparison, it is known that the fixed-coefficient variable prime length recursive discrete Fourier transform system of the present invention is able to realize an RDFT with small area, low complexity and high efficiency. Based on the aforementioned comparison result, the overall efficiency has an improved rate of more than 50.00% in comparison with the other prior arts. At the same time, regarding to the amount of coefficients required by the fixed-coefficient architecture of the present invention, there is no requirement, which means that this architecture is able to save the area requirement of coefficient ROM in chip implementation, so as to achieve the purpose of lowering the cost. The RDFT architecture proposed by the present invention has an improved rate of more than 49.34% or addition complexity in comparison with other prior arts. For multiplication complexity, in addition to being slightly higher than that of Lai, it has an improved rate of more than 50.87% in comparison with other prior arts.

Although the present invention has been explained in relation to its preferred embodiment, it is to be understood that many other possible modifications and variations can be made without departing from the spirit and scope of the invention as hereinafter claimed.

What is claimed is:

1. A fixed-coefficient variable prime length recursive discrete Fourier transform system, comprising:
    a pre-processing device for receiving N input digital signals and performing an order permutation operation to the N input digital signals, so as to generate a first temporal signal and a second temporal signal, where N is a prime number;
    a real-part computation device connected to the pre-processing device for receiving real part of the first temporal signal and real part of the second temporal signal and performing a recursive discrete cosine/sine operation, so as to generate a third temporal signal and a fourth temporal signal;
    an imaginary-part computation device connected to the pre-processing device for receiving imaginary part of the first temporal signal and imaginary part of the second temporal signal and performing a recursive discrete cosine/sine operation, so as to generate a fifth temporal signal and a sixth temporal signal; and
    a post-processing device connected to the real-part computation device and the imaginary-part computation device for receiving the third temporal signal, the fourth temporal signal, the fifth temporal signal and the sixth temporal signal, and performing an order permutation operation and addition operation, so as to generate N output signals,
    wherein the N output signals are discrete Fourier transform of the N input digital signals;
    wherein the real-part computation device and the imaginary-part computation device have same hardware architecture, the real-part computation device has a first adder and a first delay device and the imaginary-part computation device has a first adder and a first delay device; the first adder and the first delay device of the real-part computation device and the first adder and the first delay device of the imaginary-part computation device are used to compute a first output signal from the N output signals.

2. The fixed-coefficient variable prime length recursive discrete Fourier transform system as claimed in claim 1, wherein the real-part computation device has a first recursive discrete cosine/sine operation device and a second recursive discrete cosine/sine operation device.

3. The fixed-coefficient variable prime length recursive discrete Fourier transform system as claimed in claim 2, wherein when a q factor is an odd number, the first recursive discrete cosine/sine operation device performs a recursive discrete cosine transform (DCT) operation to the real part of the first temporal signal, and when the q factor is an even number, the first recursive discrete cosine/sine operation device performs a recursive discrete sine transform (DST) operation to the real part of the second temporal signal.

4. The fixed-coefficient variable prime length recursive discrete Fourier transform system as claimed in claim 3, wherein when the q factor is an odd number, the second recursive discrete cosine/sine operation device performs a recursive discrete sine transform (DST) operation to the real part of the second temporal signal, and when the q factor is an even number, the second recursive discrete cosine/sine operation device performs a recursive discrete cosine transform (DCT) operation to the real part of the first temporal signal.

5. The fixed-coefficient variable prime length recursive discrete Fourier transform system as claimed in claim 4, wherein the first recursive discrete cosine/sine operation device includes:
    a first multiplexer connected to the pre-processing device for receiving the real part of the first temporal signal and the real part of the second temporal signal, so as to generate a first multiplexing signal;
    a second adder connected to the first adder for performing an addition operation to the first multiplexing signal and a fourth addition signal, so as to generate a second addition signal;
    a second delay device connected to the second adder for performing a delay operation to the second addition signal, so as to generate a second delay signal;
    a third adder connected to the second adder and the second delay device for performing an addition operation to the second addition signal and the second delay signal, so as to generate a third addition signal;
    a first register connected to the third adder for temporarily storing the third addition signal, so as to generate a first buffering signal;
    a first shared multiplication device connected to the first register and the second delay device for performing a multiplication operation to the second delay signal or the first buffering signal, so as to generate a first multiplication signal;
    a third delay device connected to the second delay device for performing a delay operation to the second delay signal, so as to generate a third delay signal;
    a fourth adder connected to the first shared multiplication device and the third delay device for generating the fourth addition signal
    a second multiplexer for receiving the first input digital signal of the N digital signals and a constant, and generating a second multiplexing signal based on the q factor; and a fifth adder connected to the first shared multiplication device and the second multiplexer for performing an addition operation to the first multiplication signal and the second multiplexing signal, so as to generate the fifth addition operation.

6. The fixed-coefficient variable prime length recursive discrete Fourier transform system as claimed in claim 5, wherein when the q factor is an odd number, the first multiplexer outputs the real part of the first temporal signal so as to generate the first multiplexing signal, and the second multiplexer outputs the first input digital signal so as to generate the second multiplexing signal, and when the q factor is an even number, the first multiplexer outputs the real part of the second temporal signal so as to generate the first multiplexing signal, and the second multiplexer outputs the constant so as to generate the second multiplexing signal.

7. The fixed-coefficient variable prime length recursive discrete Fourier transform system as claimed in claim 6, wherein the second recursive discrete cosine/sine computation device includes:
   a third multiplexer connected to the pre-processing device for receiving the real part of the first temporal signal and the real part of the second temporal signal, and generating a third multiplexing signal;
   a sixth adder connected to the third multiplexer for performing an addition operation to the third multiplexing signal and an eighth addition signal, so as to generate a sixth addition signal;
   a fourth delay device connected to the sixth adder for performing a delay operation to the sixth addition signal, so as to generate a fourth delay signal;
   a seventh adder connected to the sixth adder and the fourth delay device for performing an addition operation to the sixth addition signal and the fourth delay signal, so as to generate a seventh addition signal;
   a second register connected to the seventh adder for temporarily storing the seventh addition signal, so as to generate a second buffering signal;
   a second shared multiplication device connected to the second register and the fourth delay device for performing a multiplication operation to the fourth delay signal or the second buffering signal, so as to generate a second multiplication signal;
   a fifth delay device connected to the fourth delay device for performing a delay operation to the fourth delay signal, so as to generate a fifth delay signal;
   an eighth adder connected to the second shared multiplication device and the fifth delay device for generating the eighth addition signal;
   a fourth multiplexer for receiving the first input digital signal of the N digital signals and a constant, and generating a fourth multiplexing signal based on the q factor; and
   a ninth adder connected to the second shared multiplication device and the fourth multiplexer for performing an addition operation to the second multiplication signal and the fourth multiplexing signal, so as to generate the ninth addition signal.

8. The fixed-coefficient variable prime length recursive discrete Fourier transform system as claimed in claim 7, wherein when the q factor is an odd number, the third multiplexer outputs the real part of the second temporal signal so as to generate the third multiplexing signal, and the fourth multiplexer outputs the constant so as to generate the fourth multiplexing signal, and when the q factor is an even number, the third multiplexer outputs the real part of the first temporal signal so as to generate the third multiplexing signal, and the fourth multiplexer 2067 outputs the first input digital signal so as to generate the fourth multiplexing signal.

9. The fixed-coefficient variable prime length recursive discrete Fourier transform system as claimed in claim 8, wherein the first shared multiplication device and the second shared multiplication device have same hardware architecture.

10. The fixed-coefficient variable prime length recursive discrete Fourier transform system as claimed in claim 9, wherein the first shared multiplication device includes:
   a fifth multiplexer having a first input terminal connected to the second delay device and a second input terminal connected to the first register for selecting the second delay signal or the first buffering signal, so as to generate a fifth multiplexing signal;
   a sixth multiplexer having a first input terminal for receiving a cosine coefficient and a second input terminal for receiving a sine coefficient, so as to generate a sixth multiplexing signal; and
   a multiplier connected to the fifth multiplexer and the sixth multiplexer for performing a sine coefficient multiplication operation or a cosine coefficient multiplication operation to the fifth multiplexing signal.

* * * * *